US012415365B2

(12) United States Patent
Kitayama et al.

(10) Patent No.: US 12,415,365 B2
(45) Date of Patent: Sep. 16, 2025

(54) LIQUID EJECTION HEAD AND LIQUID EJECTION APPARATUS

(71) Applicant: CANON KABUSHIKI KAISHA, Tokyo (JP)

(72) Inventors: Yasuaki Kitayama, Kanagawa (JP); Chiaki Muraoka, Saitama (JP); Kyosuke Toda, Kanagawa (JP); Takeho Miyashita, Kanagawa (JP); Shimpei Yoshikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/312,472

(22) Filed: May 4, 2023

(65) Prior Publication Data

US 2023/0373224 A1 Nov. 23, 2023

(30) Foreign Application Priority Data

May 18, 2022 (JP) ................................ 2022-081590

(51) Int. Cl.
*B41J 2/19* (2006.01)
*B41J 2/175* (2006.01)

(52) U.S. Cl.
CPC ............ *B41J 2/19* (2013.01); *B41J 2/17563* (2013.01)

(58) Field of Classification Search
CPC . B41J 2/19; B41J 2/17563; B41J 2/175; B41J 2/17513; B41J 2/18; B41J 2/01
USPC .......................................................... 347/92
See application file for complete search history.

(56) References Cited

U.S. PATENT DOCUMENTS

2002/0051039 A1* 5/2002 Moynihan ............ A01K 15/025 347/68
2017/0197427 A1* 7/2017 Yamada ............... B41J 2/14072
2021/0107277 A1* 4/2021 Komatsu .................... B41J 2/18

FOREIGN PATENT DOCUMENTS

JP 2003-312006 A 11/2003

* cited by examiner

*Primary Examiner* — Jason S Uhlenhake
*Assistant Examiner* — Alexander D Shenderov
(74) *Attorney, Agent, or Firm* — Canon U.S.A., Inc. IP Division

(57) ABSTRACT

A liquid ejection apparatus includes a printing element board, supply and collection flow passages, a liquid feeding mechanism, and first and second bubble reservoir units. The printing element board includes a pressure chamber having an ejection port from which the printing element board ejects a liquid. The supply and collection flow passages communicate with the pressure chamber. The liquid feeding mechanism generates a difference in pressure between the supply and collection flow passages to supply the liquid from the supply flow passage to the pressure chamber and to recover the liquid in the pressure chamber from the collection flow passage. The first bubble reservoir unit connects the supply flow passage to the liquid feeding mechanism. The second bubble reservoir unit connects the collection flow passage to the liquid feeding mechanism. A volume of the first bubble reservoir unit is larger than a volume of the second bubble reservoir unit.

20 Claims, 28 Drawing Sheets

LIQUID EJECTION HEAD AND LIQUID EJECTION APPARATUS

BACKGROUND

Field

The present disclosure relates to a liquid ejection head and a liquid ejection apparatus.

Description of the Related Art

Japanese Patent Laid-Open No. 2003-312006 discloses a liquid ejection head that which includes a fluid reservoir, a pump, a circulation flow passage, and a print head, which are provided to a carriage, and is configured to circulate a fluid into the circulation flow passage with the pump and to supply the fluid from the fluid reservoir to the print head during a printing cycle.

However, the liquid ejection head according to Japanese Patent Laid-Open No. 2003-312006 includes a separator structure to separate air and a liquid from each other, and an air vent region. Accordingly, this liquid ejection head creates a concern such as an increase in size of the head and ink adherence to the separator structure. Meanwhile, bubbles are guided to the air-liquid separator structure by inclining inside of a circulation path. However, this circulation path does not pass through the inside of a pressure chamber of the print head including nozzles to eject the liquid. In other words, according to the technique of Japanese Patent Laid-Open No. 2003-312006, there is no circulation of the fluid in the pressure chamber. As a consequence, there is a risk of causing an ejection error in a case where bubbles and the like enter the pressure chamber, for example.

SUMMARY

Applicant's disclosure provides a liquid ejection head and a liquid ejection apparatus, which suppress the occurrence of an ejection error without increasing a size of the apparatus.

According to an aspect of the present disclosure, a liquid ejection apparatus includes a printing element board including a pressure chamber provided with an ejection port, wherein the printing element board is configured to eject a liquid from the ejection port, a supply flow passage provided to the printing element board and communicating with the pressure chamber, a collection flow passage provided to the printing element board and communicating with the pressure chamber, a liquid feeding mechanism configured to generate a difference in pressure between the supply flow passage and the collection flow passage in such a way as to supply the liquid from the supply flow passage to the pressure chamber and to recover the liquid in the pressure chamber from the collection flow passage, a first bubble reservoir unit connecting the supply flow passage to the liquid feeding mechanism, and a second bubble reservoir unit connecting the collection flow passage to the liquid feeding mechanism, wherein a volume of the first bubble reservoir unit is larger than a volume of the second bubble reservoir unit.

According to the present disclosure, it is possible to provide a liquid ejection head and a liquid ejection apparatus, which suppress the occurrence of an ejection error without increasing a size of the apparatus.

Further features of the present disclosure will become apparent from the following description of exemplary embodiments with reference to the attached drawings.

DESCRIPTION OF THE EMBODIMENTS

First Embodiment

A first embodiment of the present disclosure will be described below with reference to the drawings.

Figure 1:
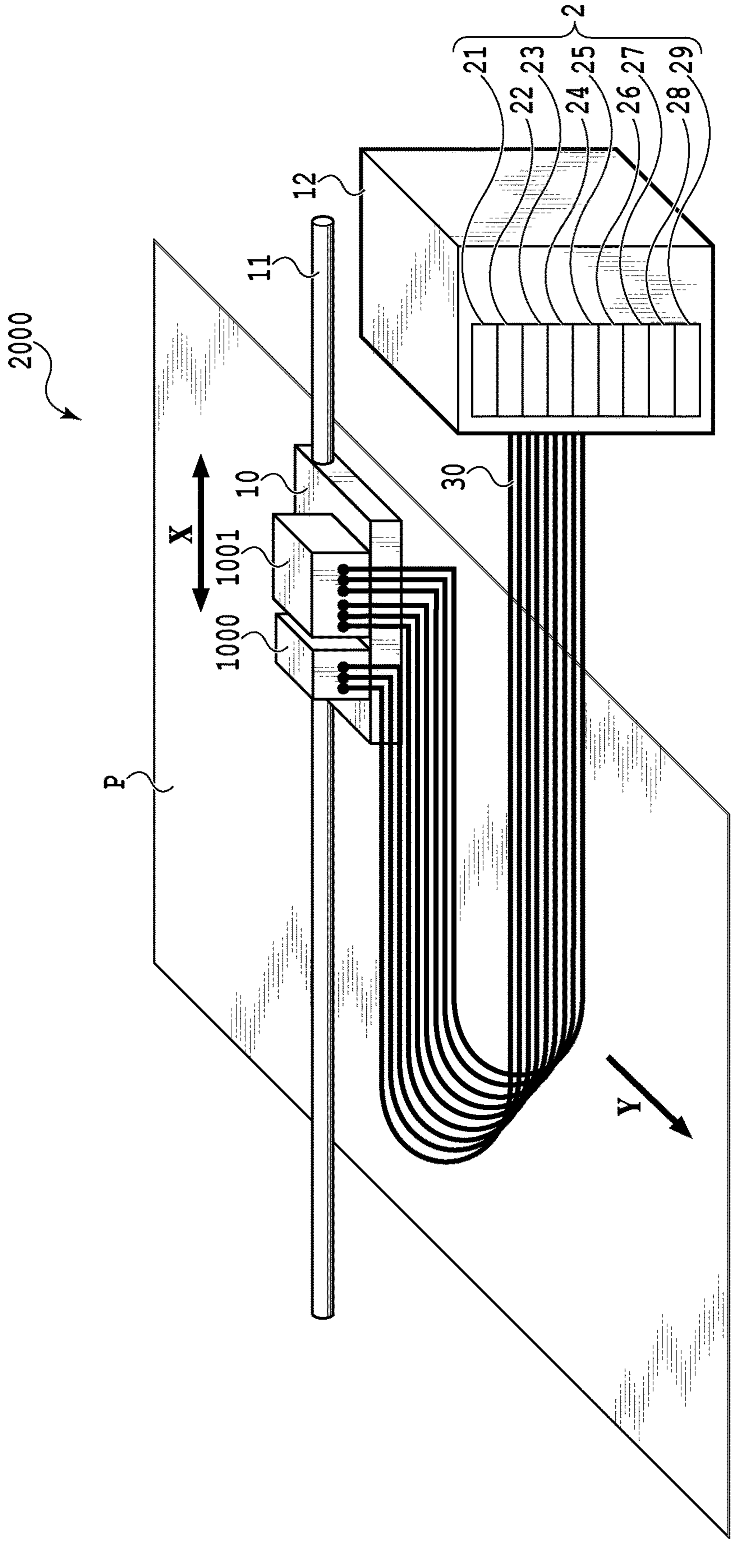
FIG. 1 is a schematic perspective view of a liquid ejection apparatus that can apply a liquid ejection head.

FIG. 1 is a schematic perspective view of a liquid ejection apparatus 2000 that can apply a liquid ejection head 1000 according to the present embodiment. The liquid ejection apparatus 2000 of the present embodiment is an ink jet printing apparatus of a serial scanning type, which is configured to print an image on a print medium P by ejecting liquids (hereinafter also referred to as inks) from liquid ejection heads 1000 and 1001. The liquid ejection heads 1000 and 1001 can be mounted on a carriage 10, and the carriage 10 is provided to be movable in a main scanning direction being x direction along a guide shaft 11. The print medium P is transported in a vertical scanning direction being y direction intersecting with (at right angle in the present embodiment) the main scanning direction by using a not-illustrated transportation roller.

Two types of liquid ejection heads are mounted on the carriage 10. The liquid ejection head 1000 can eject three types of inks while the liquid ejection head 1001 can eject six types of inks. The inks are pressure-supplied from nine types of ink tanks (liquid tanks) 2 (21, 22, 23, 24, 25, 26, 27, 28, and 29) to the liquid ejection heads through ink supply tubes 30, respectively. A supply pump to be described later for the pressure supply is mounted on an ink supply unit 12.

As a modified example, the ink tanks can be reduced to seven types by setting the three types of the inks in the liquid ejection head 1000 to the ink of the same type, or the liquid election apparatus can be configured to be able to eject twelve or more types of inks by additionally mounting one or more liquid ejection heads.

The liquid ejection head 1000 is fixed to and supported by the carriage 10 by using a positioning unit and electric contact points of the carriage 10. The liquid ejection head 1000 performs printing by ejecting the inks while being moved in the scanning direction being the x direction.

Figure 2:
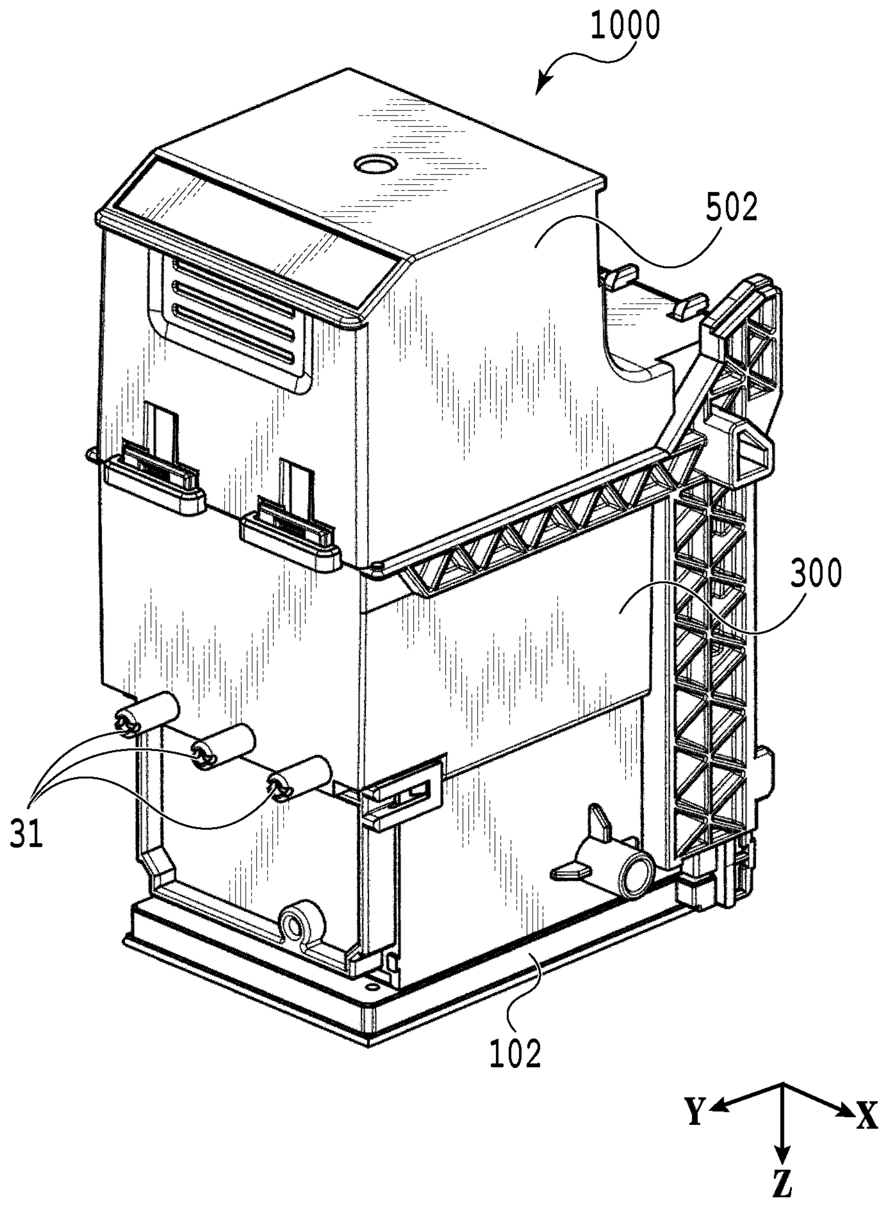
FIG. 2 is a perspective view of the liquid ejection head.
Figure 3:
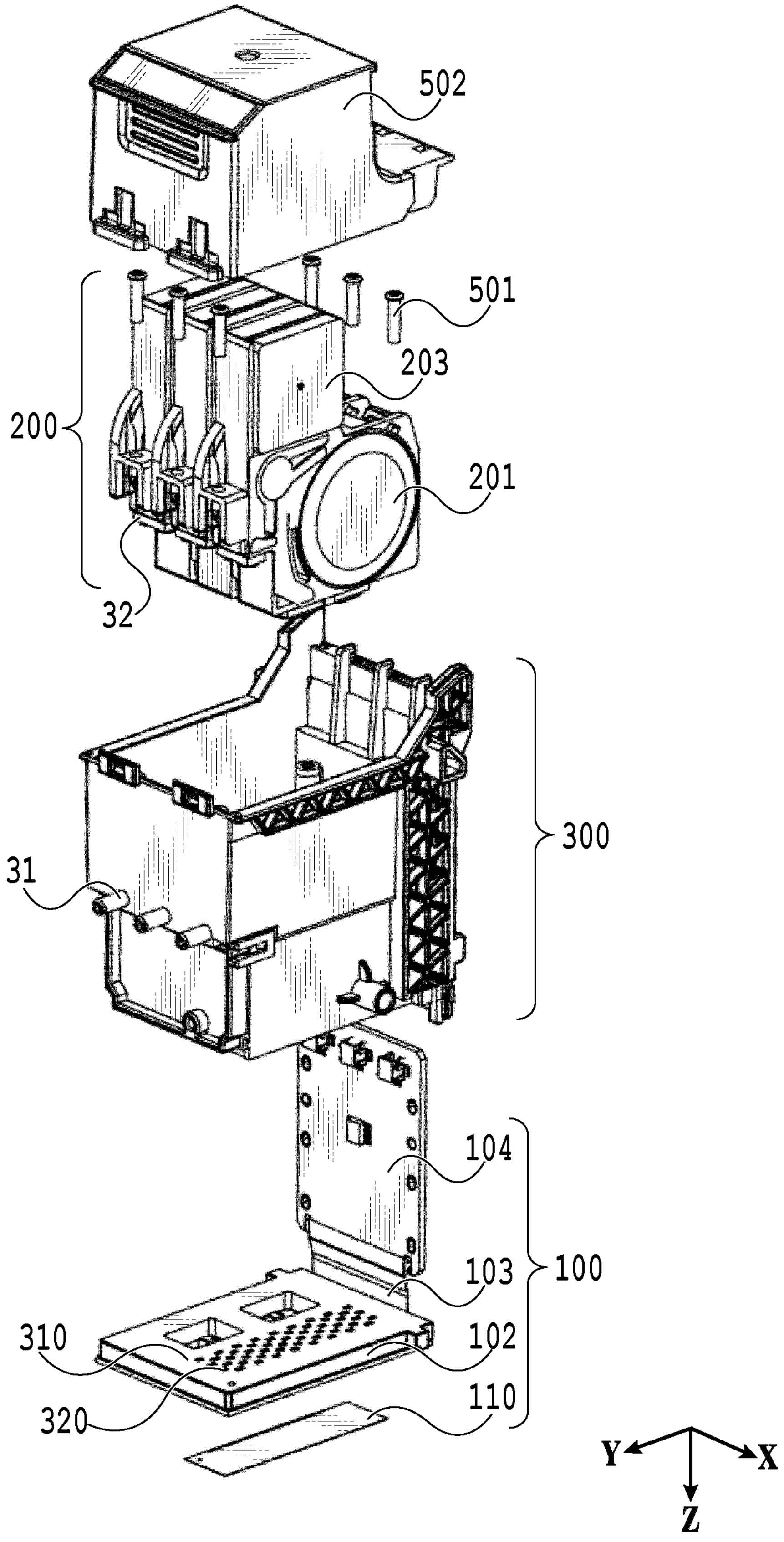
FIG. 3 is an exploded perspective view of the liquid ejection head.

FIG. 2 is a perspective view of the liquid ejection head 1000 of the present embodiment, and FIG. 3 is an exploded perspective view of the liquid ejection head 1000. The liquid ejection head 1000 includes a printing element unit 100, a circulation unit 200, a head housing unit 300, and a cover 502. The printing element unit 100 includes a printing element board 110, a support member (a flow passage member) 102 provided with an ink supply connection flow passage 310 and an ink collection connection flow passage 320 connected to the printing element board 110, an electric wiring tape 103, and an electric contact board 104. The electric contact board 104 includes electric contact points with the carriage 10, and supplies signals and energy for driving a circulation pump 203 mounted on the circulation unit 200 through a circulation unit connector 106 and not-illustrated pump lines. Moreover, the electric contact board 104 supplies driving signals and energy for ink ejection to the printing element board 110 through the electric wiring tape 103.

An electric connection module is embodied by using an anisotropic conductive film (not shown), wire bonding, solder mounting and the like. However, the connecting method is not limited only to these methods. In the present embodiment, the connection between the printing element board 110 and the electric wiring tape 103 is carried out by wire bonding. The electric connection module is sealed with a sealing material so as to protect the electric connection module against corrosion with the inks and against external impacts.

The circulation unit 200 includes a first pressure adjustment mechanism 201 and a second pressure adjustment mechanism 202 (see FIG. 4 to be described later) which are capable of adjusting pressure in a circulation path, and the circulation pump 203. The inks are supplied from the ink tanks 2 to ink supply ports 32 through the ink supply tubes 30 (see FIG. 1) and the head housing unit 300 provided with tube connectors 31. In the present embodiment, ink supply passages are formed by fixing the circulation unit 200 to the head housing unit 300 by using screws 501.

An elastic member such as rubber and elastomer is employed as a sealing member used in a connector in each ink supply passage. The printing element unit 100 is attached and fixed to the head housing unit 300, thus constituting the ink supply passage. The elastic member may be used in the connector in the ink supply passage. The head housing unit 300 is formed from a combination of components obtained by injection molding of a resin containing filler in order to achieve positioning relative to the carriage 10 and to form a shape of an ink flow passage.

The printing element board 110 is provided with ejection port rows by arranging ejection ports in the y direction. The multiple ejection port rows are provided in the x direction.

Figure 4:
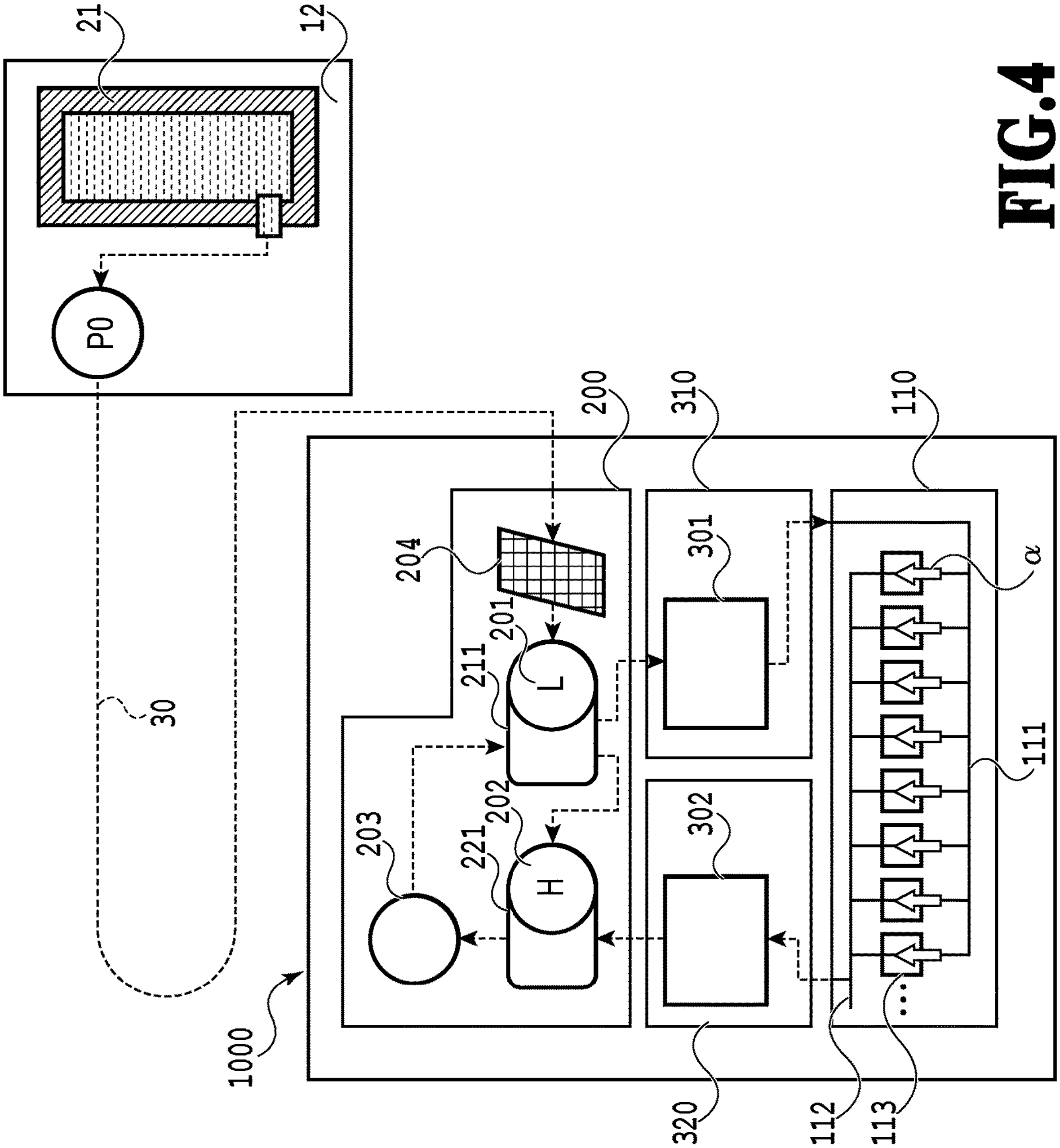
FIG. 4 is a schematic diagram showing a circulation path for one ink color in a steady state.

FIG. 4 is a schematic diagram showing a circulation path for one ink color in a steady state to be applied to the liquid ejection apparatus 2000 of the present embodiment. The ink is pressure-supplied from the ink tank 21 to the liquid ejection head 1000 by using a supply pump P0. The ink is deprived of dust and the like by using a filter 204, and is then supplied to the first pressure adjustment mechanism 201. In FIG. 4 (as well as in FIG. 6 to be described later), the first pressure adjustment mechanism 201 is marked with "L" while the second pressure adjustment mechanism 202 is marked with "H". Here, "H" represents a high negative pressure and "L" represents a low negative pressure, which are opposite from high and low levels based on a positive pressure. The first pressure adjustment mechanism 201 adjusts a pressure in a first pressure control chamber 211 to a predetermined pressure (a negative pressure). The circulation pump 203 is a piezoelectric diaphragm pump configured to change a volume inside a pump chamber by inputting a driving voltage to a piezoelectric element attached to a diaphragm, and to feed a liquid by alternately activating two check valves along with pressure variations.

The circulation pump 203 feeds the ink from a second pressure control chamber 221 on a low pressure (a high negative pressure) side to the first pressure control chamber 211 on a high pressure (a low negative pressure) side. The second pressure control chamber 221 is subjected to pressure adjustment to the lower pressure than that in the first pressure control chamber 211 by the second pressure adjustment mechanism 202. Pressure chambers 113 each having an ejection port that can eject the liquid are disposed on the printing element board 110. Common supply flow passages 111 and common collection flow passages 112 are connected to the respective pressure chambers 113.

Each common supply flow passage 111 is connected to the first pressure control chamber 211 through the first ink connection flow passage 310, and the pressure in the common supply flow passage 111 is therefore adjusted to a high pressure (an upstream) side. Each common collection flow passage 112 is connected to the second pressure control chamber 221 through the second ink connection flow passage 320, and the pressure in the common collection flow passage 112 is therefore adjusted to a low pressure (a downstream) side. A flow in a direction of an arrow α in FIG. 4 is generated in each pressure chamber 113 due to a difference in pressure between the common supply flow passage 111 and the common collection flow passage 112. A portion of the ink with increased viscosity, which is present in the vicinity of each ejection port that is in a standby state or not ejecting the ink during a printing operation, is recovered from the pressure chamber 113. Thus, an ejection error can be suppressed.

In the present embodiment, a first bubble reservoir unit 301 is disposed in the first ink connection flow passage 310, and a second bubble reservoir unit 302 is disposed in the second ink connection flow passage 320. Each of the first bubble reservoir unit 301 and the second ink connection flow passage 320 has such a volume that can temporarily reserve bubbles inside ink paths which are generated either during the printing operation or during the standby for printing.

Figure 5A:
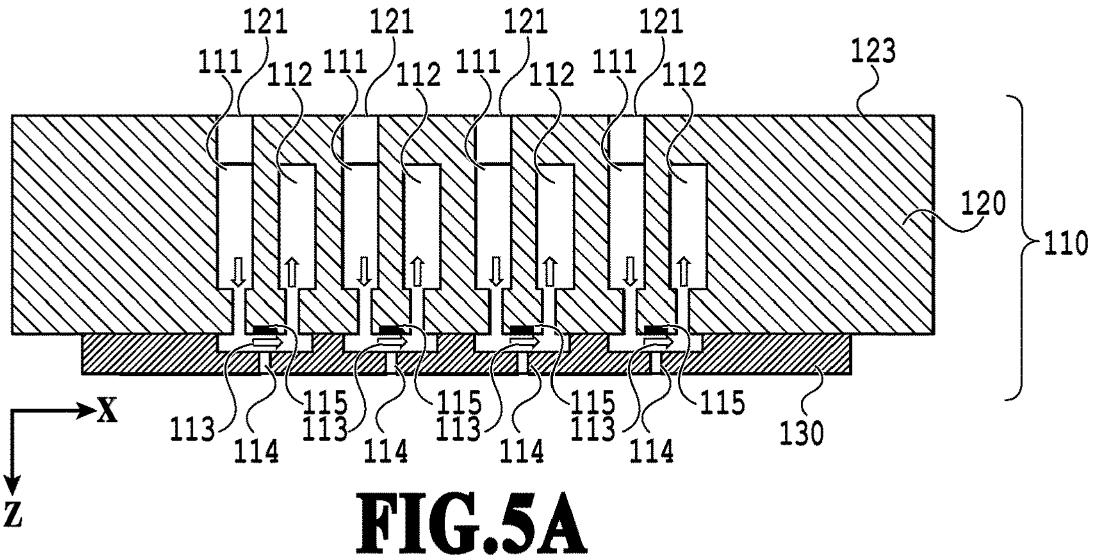
FIG. 5A is a cross-sectional view of a printing element board taken at a certain position in y direction.
Figure 5B:
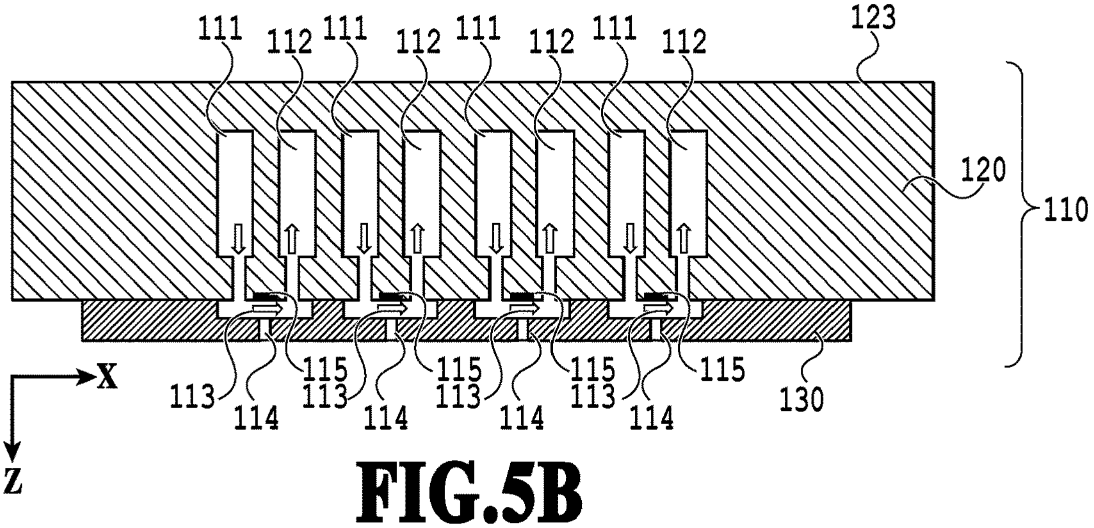
FIG. 5B is a cross-sectional view of the printing element board taken at a different position in the y direction.
Figure 5C:
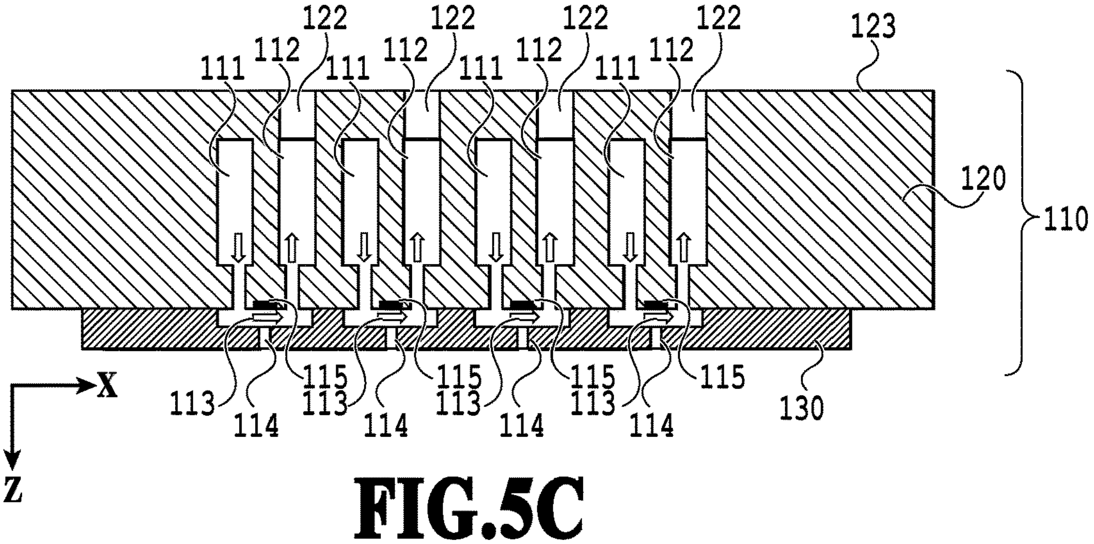
FIG. 5C is a cross-sectional view of the printing element board taken at another different position in the y direction.

FIGS. 5A to 5C are cross-sectional views of the printing element board 110 taken at different positions in the y direction. The printing element board 110 includes a Si substrate 120 on which a not-illustrated electric circuit and heaters 115 serving as pressure generating mechanisms are disposed, and an ejection port member 130 in which the pressure chambers 113 and ejection ports 114 corresponding to the heaters 115 are patterned by photolithography. Although the present embodiment is configured to obtain ejection energy by generating a bubble of the ink inside each pressure chamber 113 by applying a voltage to the corresponding heater 115, the pressure generating mechanism is not limited only to this configuration. A piezoelectric element may be used instead of the heater. The printing element board 110 is stacked on the support member 102 while the Si substrate 120 includes a contact surface 123. The contact surface 123 is attached and fixed to the support member 102, thereby being connected to the respective ink supply passages.

In the present embodiment, distances in the x direction of the common supply flow passages 111 and the common collection flow passages 112 are set to a pitch of 1 mm or below in order to ensure ink supply performances to the pressure chambers 113 and to achieve cost reduction by downsizing the substrate size. Meanwhile, four ejection port rows each arranging the ejection ports at 600 dpi are deployed from the viewpoint of dotting efficiency on the print medium P. Note that the resolution of the ejection port deployment and the number of ejection port rows are not limited to the aforementioned examples.

FIG. 5A shows a cross-section of common supply flow passage openings 121 at a position where the common supply flow passages 111 communicate with the contact surface 123. FIG. 5B shows a cross-section at a position where none of the common supply flow passages 111 and the common collection flow passages 112 communicate with the contact surface 123. FIG. 5C shows a cross-section of common collection flow passage opening 122 at a position where the common collection flow passages 112 communicate with the contact surface 123.

In order to control a difference in pressure between each common supply flow passage 111 and the corresponding common collection flow passage 112, it is necessary to divide the ink supply passages other than the pressure chambers 113 and the pressure control mechanisms. To this end, the first ink connection flow passage 310 and the second ink connection flow passage 320 need to be divided in a direction of the ejection port rows at the position of the cross-section shown in FIG. 5B. Each of the common supply flow passage 111 and the common collection flow passage 112 has a very small cross-sectional area, and therefore has a risk of causing a shortage of ink supply due to a pressure loss associated with liquid feeding. For this reason, it is desirable to form the common supply flow passage 111 and the common collection flow passage 112 not communicating with the contact surface 123 shown in FIG. 5B as short as possible. Accordingly, it is desirable to provide the numerous common supply flow passage openings 121 shown in FIG. 5A and numerous common collection flow passage openings 122 shown in FIG. 5C in the direction of the ejection port rows.

In the exploded perspective view of FIG. 3, the first ink connection flow passages 310 for one color are disposed at nine positions and the second ink connection flow passages 320 for the one color are disposed at eight positions. The numbers of these positions of connection vary depending on lengths of the ejection port rows and on a division bonding width. In the present embodiment, the cross-sectional area of each common supply flow passage 111 and each common collection flow passage 112 of FIG. 5B is equal to or below 0.1 $mm^2$, and a distance between each common supply flow passage opening 121 and the corresponding common collection flow passage opening 122 is equal to or below 7.5 mm.

Figure 6:
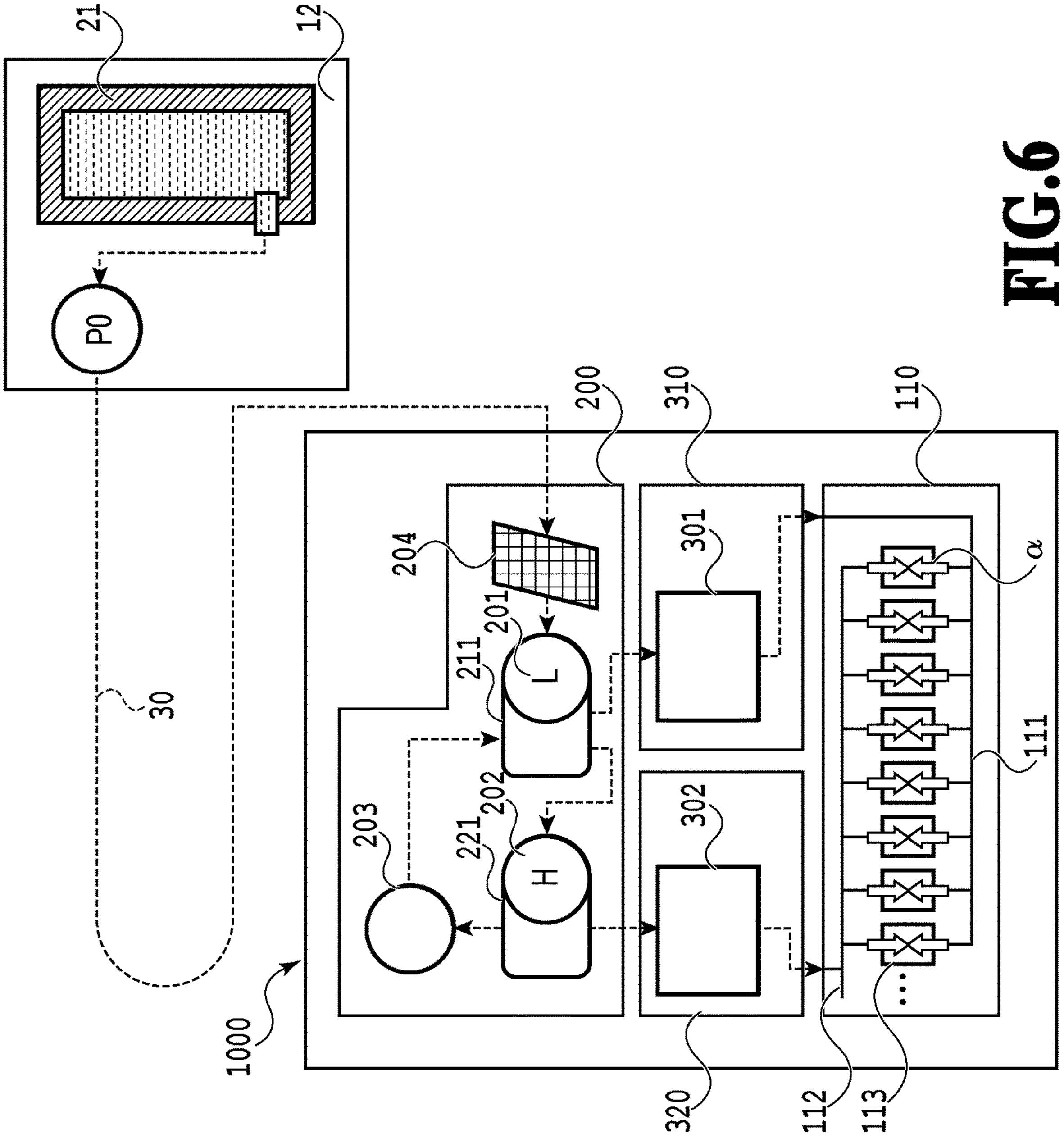
FIG. 6 is a diagram showing a flow of an ink in a case of performing printing by using a majority of ejection ports.

FIG. 6 shows a flow of the ink in the circulation path for one color in a case of performing printing by using the majority of the ejection ports. In the case of performing the printing by using the majority of the ejection ports, the ink is supplied from both of the common supply flow passage 111 and the common collection flow passage 112 to the corresponding pressure chamber 113 unlike the way of flow in the case of circulation in the steady state.

In the case where the ink is ejected from a certain pressure chamber 113, the ink is supplied from each of the common supply flow passage 111 and the common collection flow passage 112. The common supply flow passage 111 supplies the ink, which is supplied from the first pressure control chamber 211 through the first ink connection flow passage 310, to the corresponding pressure chamber 113. Meanwhile, the common collection flow passage 112 supplies the ink, which is supplied from the second pressure control chamber 221 through the second ink connection flow passage 320, to the corresponding pressure chamber 113. The circulation pump 203 transports the ink from the second pressure control chamber 221 to the first pressure control chamber 211 in the same way as in the steady state.

In this instance, the second pressure control chamber 221 supplies the ink to the second ink connection flow passage 320 and the circulation pump 203. Moreover, the second pressure control chamber 221 retains the constant pressure by causing the second pressure adjustment mechanism 202 to supply the ink from the first pressure control chamber 211 through a bypass flow passage that connects the first pressure adjustment mechanism 201 to the second pressure adjustment mechanism 202. While the first pressure control chamber 211 supplies the ink to the second pressure adjustment mechanism 202 and the first ink connection flow passage 310, the first pressure control chamber 211 retains the constant pressure by causing the first pressure adjustment mechanism 201 to recover the ink from the ink tank 21 serving as an ink supply source together with the portion of the ink transported by the circulation pump 203.

As described above, the direction of flow of the ink in the common collection flow passage 112 is changed depending on the printing state, and the direction of flow of the ink in the second ink connection flow passage 320 is changed in accordance therewith.

Figure 7:
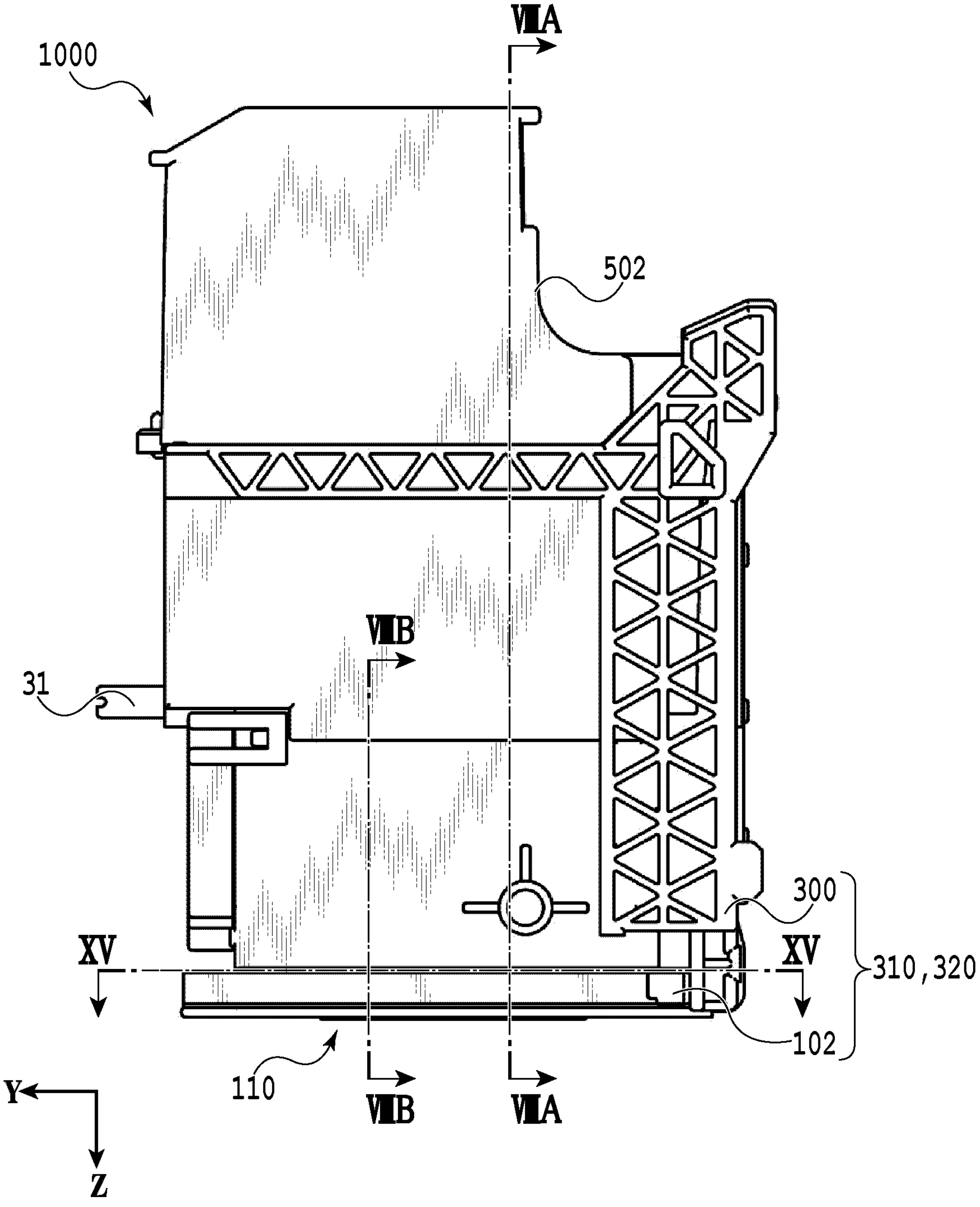
FIG. 7 is a side view showing the liquid ejection head.
Figure 8B:
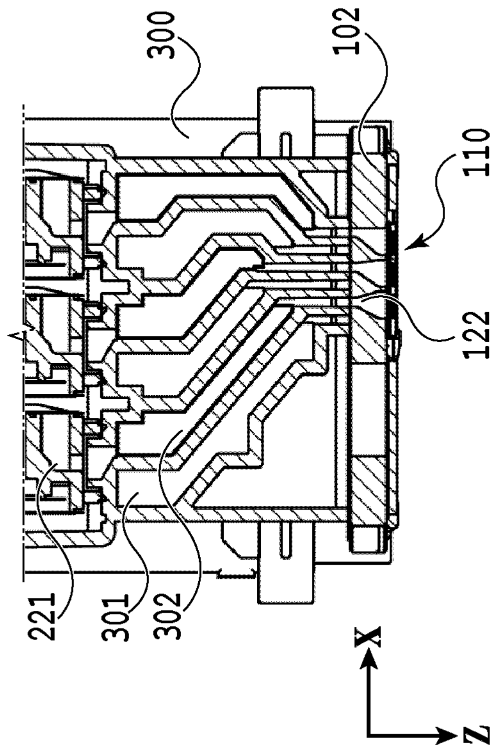
FIG. 8B is another cross-sectional view showing the liquid ejection head.
Figure 8A:
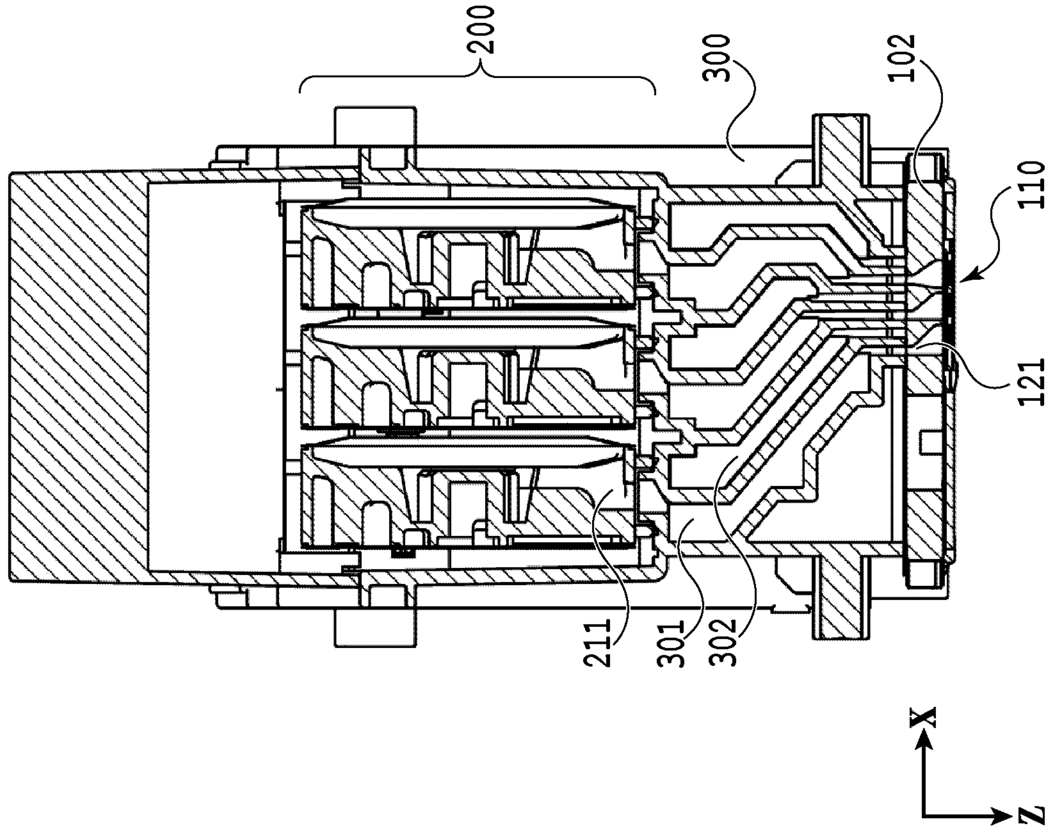
FIG. 8A is a cross-sectional view showing the liquid ejection head.

FIG. 7 is a side view showing the liquid ejection head 1000. FIG. 8A is a cross-sectional view taken along the VIIIA-VIIIA line in FIG. 7. FIG. 8B is a cross-sectional view taken along the line in FIG. 7. The printing element board 110 is provided with the ejection port rows along the y direction being a direction of movement of the print medium P, and the inks are ejected in z direction from the respective ejection ports. The first ink connection flow passage 310 and the second ink connection flow passage 320 are formed from the head housing unit 300 and the support member 102.

The printing element board 110 is supported by the support member 102. The printing element board 110 is supported in such a way as to establish connection from the first pressure control chamber 211 to the common supply flow passage opening 121 and the common supply flow passage 111 through the first ink connection flow passage 310. Meanwhile, the printing element board 110 is supported in such a way as to establish connection from the second pressure control chamber 221 to the common collection flow passage opening 122 and the common collection flow passage 112 through the second ink connection flow passage 320 as shown in FIG. 8B.

The first pressure control chamber 211 and the second pressure control chamber 221 are controlled at constant pressures by using the pressure adjustment mechanisms built in the circulation unit 200.

Figure 9:
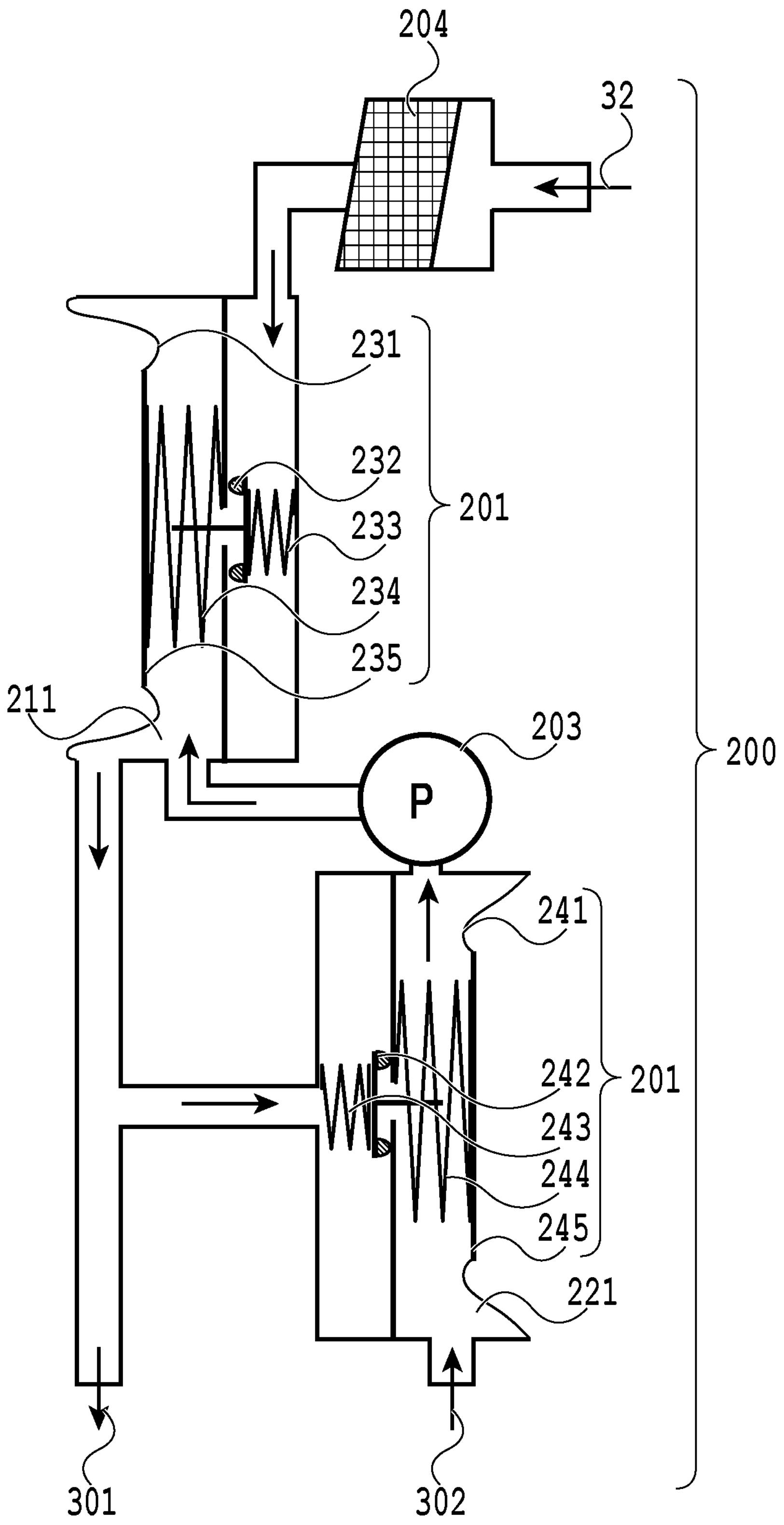
FIG. 9 is a schematic diagram that clarifies inside of a circulation unit.

FIG. 9 is a schematic diagram that clarifies the inside of the circulation unit 200. In the circulation unit 200, the ink is pressure-supplied from the ink supply unit 12 to the first pressure adjustment mechanism 201 through the ink supply port 32 and the filter 204. The pressure adjustment mechanism 201 includes a valve 232, a valve spring 233, a flexible member 231, a pressing plate 235, and a pressure adjustment spring 234.

In the pressure control chamber 211, the pressing plate 235 deforms the flexible member 231 and the pressure adjustment spring 234 in the case where a volume of the pressure control chamber 211 is reduced due to discharge of the ink and the like, thus attempting to keep the pressure inside the pressure control chamber 211 constant. By compressive deformation of the pressure adjustment spring 234, the valve spring 233 is deformed in a compressive direction through the valve 232. Thus, it is possible to open the valve 232 and to supply the ink to the pressure control chamber 211. This behavior makes it possible to supply the ink and to keep the constant pressure inside the pressure control chamber 211. The negative pressure in the pressure control chamber 211 is set depending on positions of contact of the pressure adjustment spring 234 and the valve 232 with the pressing plate 235.

The pressure adjustment mechanism 202 of the pressure control chamber 221 includes a valve 242, a valve spring 243, a flexible member 241, a pressing plate 245, and a pressure adjustment spring 244. The principle of adjustment of the pressure in the pressure adjustment mechanism 202 is the same as the principle applicable to the pressure adjustment mechanism 201 with the only exception that the ink supply source is changed from the ink supply unit 12 to the pressure control chamber 211.

The circulation pump 203 is connected in such a way as to feed the ink in the pressure control chamber 221 to the pressure control chamber 211. In the present embodiment, a small diaphragm pump using a piezoelectric element is adopted as the circulation pump 203. Since the pump can be driven by applying a voltage pulse to the piezoelectric element, it is possible to control on and off of the circulation pump 203 by using the inputted voltage pulse. By transferring the ink in the pressure control chamber 221 to the pressure control chamber 211 by using the circulation pump 203, the pressure control chamber 211 is set to a state of an applied pressure in an amount equivalent to the ink that is fed in, and the pressure control chamber 221 is set to a state of a negative pressure in an amount equivalent to the ink that is fed out.

As the pressure control chamber 221 is set to the negative pressure, the pressure control chamber 221 recovers the ink through the pressure adjustment mechanism 202. On the other hand, the pressure adjustment mechanism 202 recovers the ink from the pressure control chamber 211 and the pressure chamber 113, and therefore generates a circulating flow while keeping the pressure constant. As a consequence of generating the circulating flow through the pressure chamber 113 as described above, it is possible to remove the ink with increased viscosity in the vicinity of the ejection ports due to evaporation of the ink, and thus to achieve stable ejection.

Figure 10B:
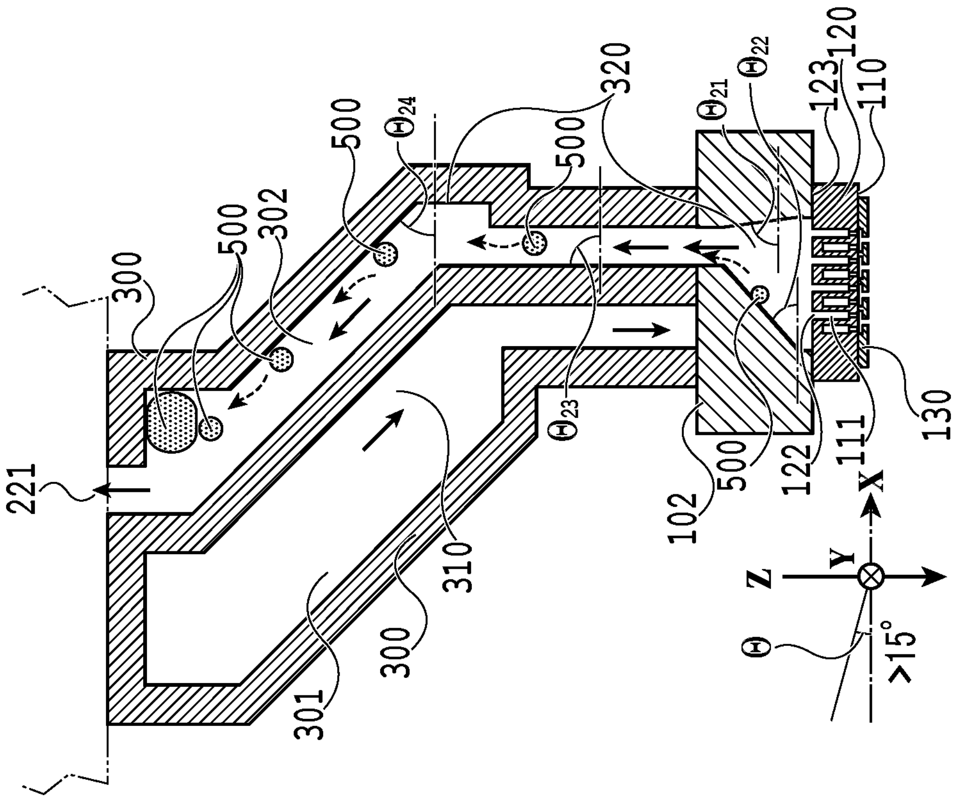
FIG. 10B is another cross-sectional view showing the first ink connection flow passage and the second ink connection flow passage.
Figure 10A:
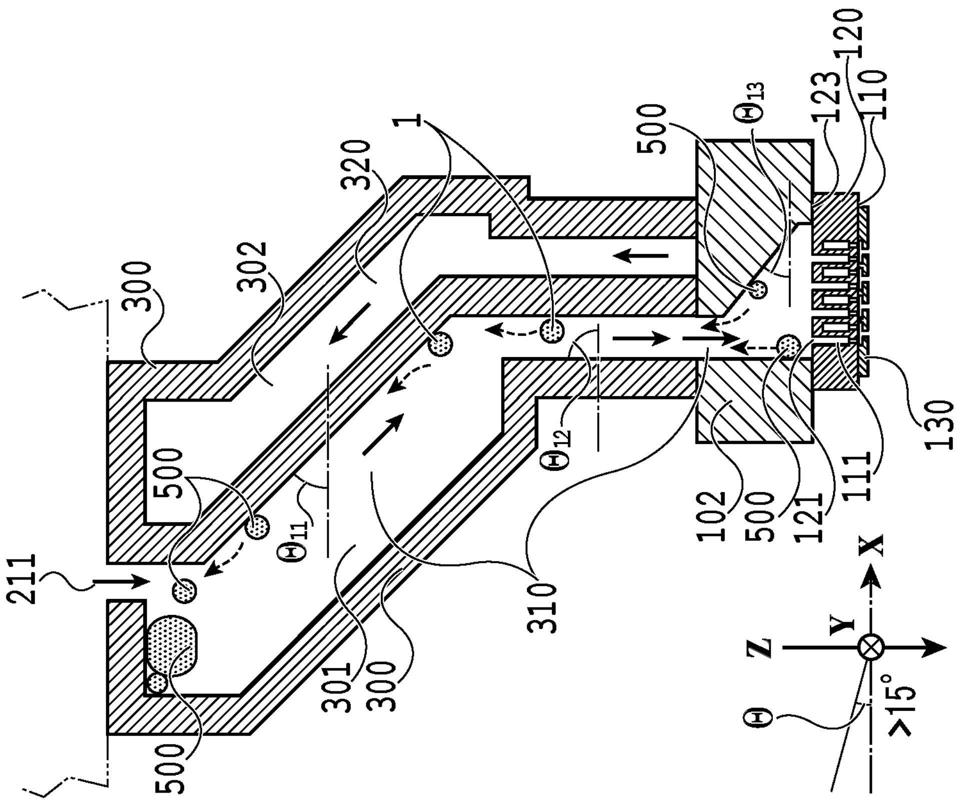
FIG. 10A is a cross-sectional view showing a first ink connection flow passage and a second ink connection flow passage.

FIG. 10A is a cross-sectional view showing the first ink connection flow passage 310 connected to the pressure control chamber 211 in the present embodiment, and FIG. 10B is a cross-sectional view showing the second ink connection flow passage 320 connected to the pressure control chamber 221. The printing element board 110 includes the ejection port member 130 and the Si substrate 120. A not-illustrated warming heater for stabilizing ejection is disposed on the Si substrate 120. Meanwhile, in order to homogenize the temperature of the entire printing element board 110 and to achieve stable bonding to the Si substrate 120, the support member 102 employs an alumina material that has high thermal conductivity and a linear coefficient of expansion which is close to that of Si.

In FIGS. 10A and 10B, arrows (in solid lines) indicated in the flow passages show flows of the circulated inks by driving the circulation pump 203 at the time of not performing the printing. To be more precise, in FIG. 10A, the ink flows from the pressure control chamber 211 to the common supply flow passage opening 121 while passing through the first ink connection flow passage 310 which is formed from the head housing unit 300 including the first bubble reservoir unit 301 and from the support member 102. This flow of the ink starts from the common supply flow passage 111, passes through the pressure chambers 113 that eject the ink, flows to the common collection flow passage 112, and is then recovered from the common collection flow passage opening 122. Moreover, the second ink connection flow passage 320 which is formed from the head housing unit 300 including the second bubble reservoir unit 302 and from the support member 102 supplies the ink recovered from the common collection flow passage opening 122 to the pressure control chamber 221. Subsequently, the circulation pump 203 feeds the ink from the pressure control chamber 221 to the pressure control chamber 211. Thus, the circulating flow goes around.

Figure 11A:
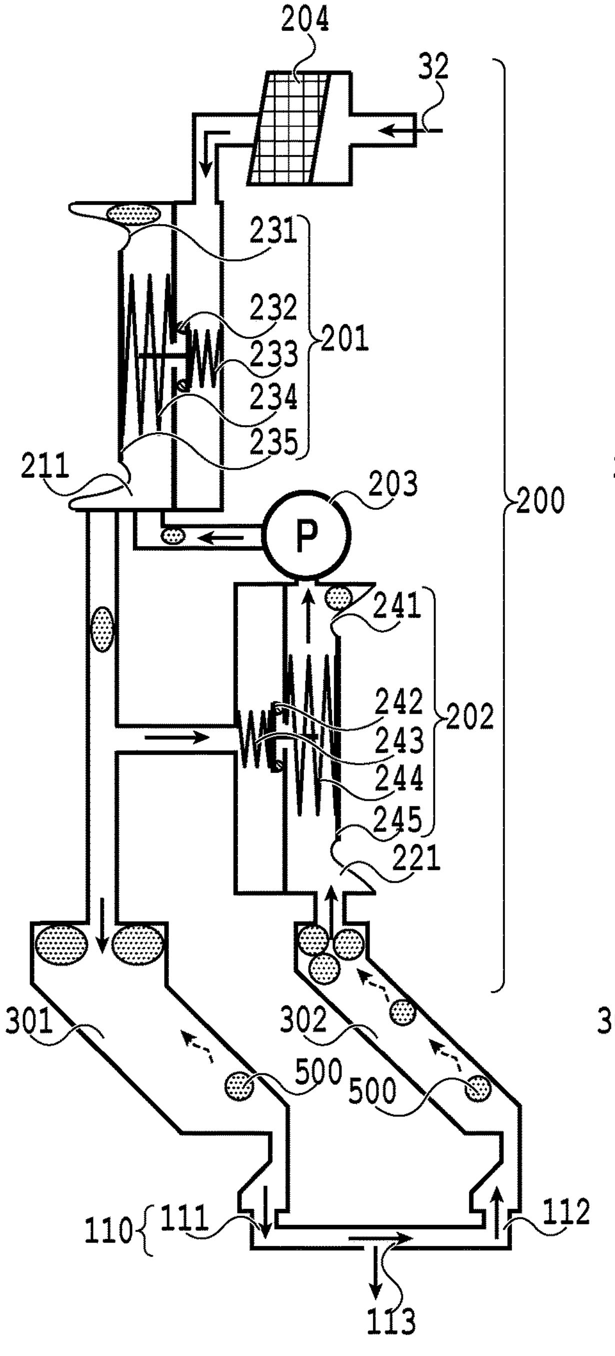
FIG. 11A is a schematic diagram showing a circulation flow passage.
Figure 11B:
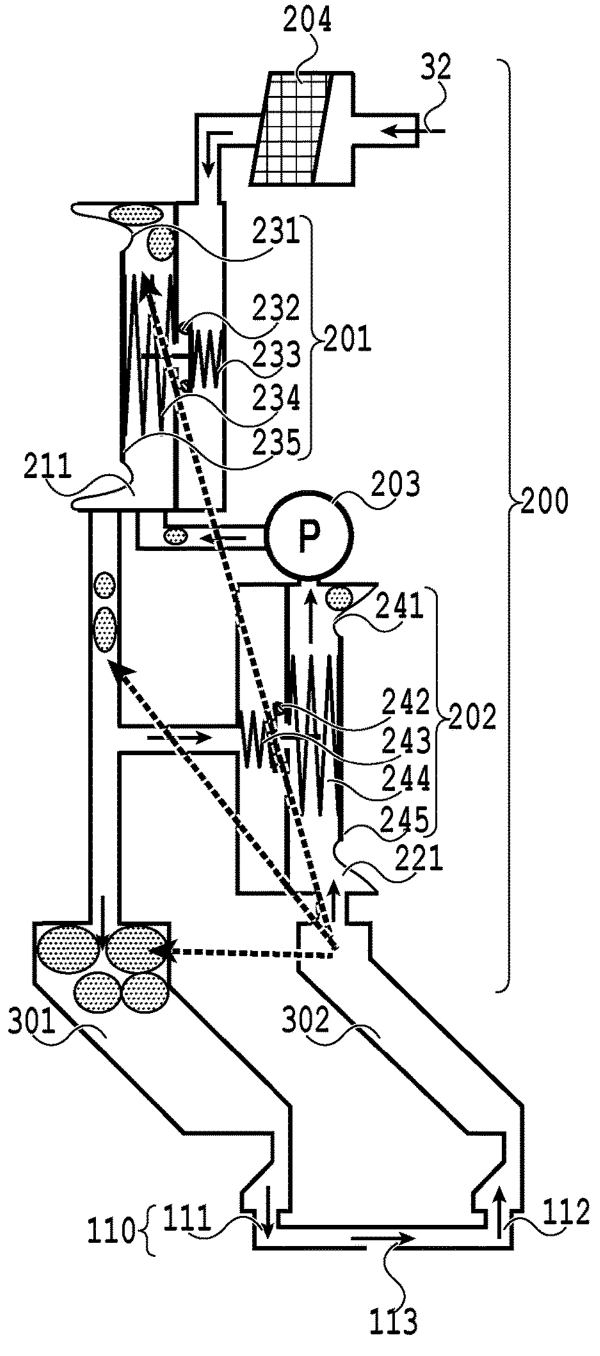
FIG. 11B is another schematic diagram showing the circulation flow passage.

FIG. 11A is a schematic diagram showing the circulation flow passage in a state of ink ejection, and FIG. 11B is a schematic diagram showing the circulation flow passage in a case of continuing the circulation for a while without generation of bubbles. The circulating flow is completed inside the ink flow passages of the liquid ejection head 1000. Accordingly, bubbles 500 generated inside the flow passages of the liquid ejection head 1000 should be present somewhere in the circulating flows inclusive of the circulation in the first pressure control chamber 211 and in the second pressure control chamber 221. The bubbles 500 are generated by: foaming caused at the time of ink filling, along with the ink flow, and the like; supersaturation of a gas dissolved in the ink associated with a rise in temperature or reduction in pressure inside the liquid ejection head 1000; and the like. In the case where the bubbles 500 flow into any of the pressure chambers 113, the bubbles 500 are prone to cause an ejection error of the ink that may lead to an image error. Accordingly, it is desirable to reserve these bubbles 500 at a portion of the circulation flow passage located away from the pressure chambers 113 so as not to let the bubbles 500 flow into the pressure chambers 113.

In a case of a general liquid ejection head without provision of a portion to reserve bubbles in its flow passage, it is necessary to use the liquid ejection head in a range where the dissolved gas does not cause supersaturation while controlling a degree of deaeration of the ink, or to discharge generated bubbles out of the liquid ejection head in each case of generation. There are methods of controlling the degree of deaeration including agitation under a reduced pressure, a deaeration module adopting a hollow fiber membrane, and the like. However, these methods may cause high costs and increases in head size and weight, and are therefore likely to adversely affect a printing speed and other performances. On the other hand, in the case where the ink containing the bubbles is discharged in each case, the ink supposed to be used for printing is discharged as waste ink. Therefore, this method leads to an increase in printing cost.

Given the circumstances, in the present embodiment, as shown in FIG. 11A, the first bubble reservoir unit 301 and the second bubble reservoir unit 302 are located at positions distant from the pressure chambers 113 in the circulation flow passage so as to gather the generated bubbles 500 in the first bubble reservoir unit 301 and the second bubble reservoir unit 302. In this way, it is possible to keep the bubbles 500 from flowing into the pressure chambers 113, thereby reducing the chance of causing an ejection error. By reducing the occurrence of the ejection error in accordance with the above-described method, it is possible to suppress a significant increase in head size or an increase in amount of waste ink.

Due to the circulating flow at the time of not performing the printing, the flow of the ink from the printing element board 110 inclusive of the pressure chambers 113 toward the second bubble reservoir unit 302 is generated in the second ink connection flow passage 320. Accordingly, the bubbles 500 are gathered in the second bubble reservoir unit 302 by the flow of the ink. On the other hand, the flow of the ink directed to the printing element board 110 is generated in the first ink connection flow passage 310. It is therefore difficult to gather the bubbles 500 in the first bubble reservoir unit 301.

Given the circumstances, ceiling surfaces in the first ink connection flow passage 310 have angles (θ11 and θ13) in a range from about 40 degrees to 50 degrees relative to the surface provided with the ejection ports in the present embodiment (see FIG. 10A). Here, the ceiling is a surface that defines part of the flow passage, which corresponds to an inner wall of the flow passage where a component force of a normal vector at the ceiling surface has a component in a gravitational direction (the z direction).

According to the above-described configuration, even in the case where the flow of the ink directed to the printing element board 110 is generated, the bubbles 500 are guided easily to the first bubble reservoir unit 301 so that the bubbles 500 can be gathered at the position distant from the pressure chambers 113. These angles θ are determined based on a coefficient of friction defined by physical properties of the ink and the inner wall of the first ink connection flow passage 310, and on a migration force attributed to buoyancy.

It has been confirmed that the ink used in the liquid ejection head 1000 and the member of the first ink connection flow passage 310 in the present embodiment successfully achieved the effects of the present embodiment by providing the ceiling surfaces with the angle of about 15 degrees or above relative to the surface provided with the ejection ports. It is more preferable to set each ceiling surface with an angle close to 90 degrees with which 100% of the component force of the buoyancy of each bubble 500 can be used for the migration force.

Moreover, in the present embodiment, ceiling surfaces in the second ink connection flow passage 320 have angles (θ22 and θ24) in a range from about 40 degrees to 50 degrees relative to the surface provided with the ejection ports in the present embodiment (see FIG. 10B). Accordingly, the movement of the bubbles 500 to the second bubble reservoir unit 302 can be completed in a short time by using a circulating flow pressure in addition to the migration force attributed to the buoyancy.

Meanwhile, the bubbles 500 gathered in the second bubble reservoir unit 302 gradually move from the second bubble reservoir unit 302 to the first pressure adjustment chamber 211 and the first bubble reservoir unit 301 through the second pressure adjustment chamber 221 and the circulation pump 203 by use of the circulating flow (see FIG. 11B). The bubbles 500 in the first bubble reservoir unit 301 also have to be kept from reaching the pressure chambers 113 in the case where the bubbles 500 move toward the supply flow passage on the downstream of the circulation pump as mentioned above. For this reason, it is desirable to secure a volume large enough for reserving the bubbles 500 by setting the volume on the downstream of the circulation pump 203 larger than that of the flow passage on the upstream of the circulation pump 203.

Meanwhile, in the circulation passage, the first pressure control chamber 211 and the second pressure control chamber 221 can change their volumes for the purpose of the pressure control. It is therefore desirable to provide the bubble reservoir units of certain volumes at separate locations. In the present embodiment, the first bubble reservoir unit 301 and the second bubble reservoir unit 302 are provided, and the volumes of these units are set to satisfy a relation of (volume of first bubble reservoir unit 301)>(volume of second bubble reservoir unit 302).

Here, a capability of reserving the bubbles 500 is higher as a flow passage volume is larger. However, a careless increase of the entire volume may lead to an increase in head size or an increase in amount of the required ink. Meanwhile, in a case of a complicated flow passage shape provided with a space in a certain volume, there is a filling method called choke suction, which is designed to perform ink filling by releasing an ink supply valve after reducing a pressure to a certain pressure so as to fill a space in an anti-gravitational direction with the ink as well.

While the present embodiment also employs the choke suction, this filling method still causes the gas to be left at a certain percentage of the entire flow passage volume. Accordingly, an expansion in flow passage volume also leads to an increase in initial amount of the gas. For this reason, the larger flow passage volume is not always desirable, and the total flow passage volume and the difference in volume between the upstream and the downstream of the circulation pump need to be determined in consideration of the pressure loss, the initial amount of the gas, a generated amount of the gas, and so forth.

In the case of the present embodiment, the volume on the downstream of the pump (from an outlet of the pump to the ejection ports) is equal to about 6.4 cc while the volume on the upstream of the pump (from the ejection ports to an inlet of the pump) is equal to about 4.2 cc. Here, the volume on the downstream of the pump is nearly 1.5 times as large as the volume on the upstream of the pump. These volumes create a difference in volume while summing up the first and second pressure adjustment chambers, the first and second ink connection flow passages, and the flow passages connecting these constituents to one another. In other words, a relation of "volume of first pressure adjustment chamber (211)>volume of second pressure adjustment chamber (221)" holds true and a relation of "volume of first ink connection flow passage (310)>volume of second ink connection flow passage (320)" holds true.

The ink in an amount of about 20% of the entire volume is calculated to remain even in the case where the entire volume on the upstream of the pump is gasified and moves to the downstream of the pump due to the remaining gas of initial ink filling and generation of the gas associated with continuous ejection. An initial ink filling ratio relies on product specifications depending on the pressure loss at the time of filling and the number of times of suctioning. The amount of generation of the gas due to the ejection varies depending on the ink type and the temperature. Moreover, the timing of discharge of the gas also relies on the product specifications. Accordingly, it is not possible to generally determine a minimum volume rate. However, it is necessary to set the volume on the downstream of the pump at least about 1.2 times as large as the volume on the upstream of the pump in order to cause at least 10% of the ink to remain.

In the present embodiment, the pump is mounted inside the liquid ejection head 1000. This is a particularly effective configuration because a method of removing the gas in the flow passages is limited to suctioning from the ejection ports. However, the present embodiment is not limited only to the configuration to complete the circulation flow passages inside the liquid ejection head. For example, a case of providing the circulation pump outside the liquid ejection head (in a printing apparatus body or the like) and a configuration not provided with a gas removal unit are also acceptable. Even in the case of the above-mentioned configuration, it is effective to set a "volume from a discharge port of a circulation pump to supply ports of a head and a printing element board" larger than a "volume from collection ports of the head and the printing element board to an inflow port of the circulation pump" in order to reduce a frequency of gas removal operations.

Meanwhile, as a consequence of setting the volume of the first ink connection flow passage 310 larger than the volume of the second ink connection flow passage 320, a flow velocity of the ink flowing in the first ink connection flow passage 310 becomes slower than a flow velocity of the ink flowing in the second ink connection flow passage 320. By slowing down the flow velocity of the ink, the bubbles 500 in the first ink connection flow passage 310 are easily detached from the pressure chambers 113 thanks to the action of buoyancy. In addition, by setting the volume of the second ink connection flow passage 320 smaller than the volume of the first ink connection flow passage 310, the flow velocity of the ink flowing in the second ink connection flow passage 320 becomes faster than the flow velocity of the ink flowing in the first ink connection flow passage 310. By increasing the flow velocity of the ink, the bubbles 500 in the second ink connection flow passage 320 are detached easily from the pressure chambers 113 due to the action of buoyancy and the flow velocity of the ink.

Figure 12B:
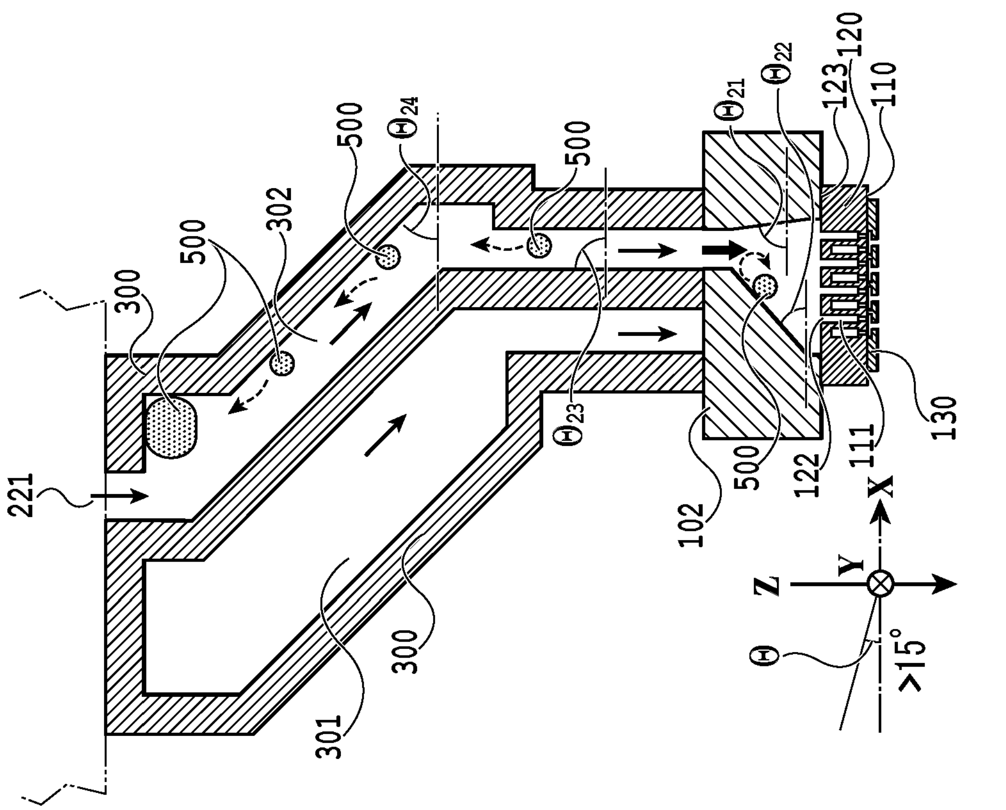
FIG. 12B is another diagram showing a flow of the ink and behaviors of bubbles in the case of using numerous ejection ports.
Figure 12A:
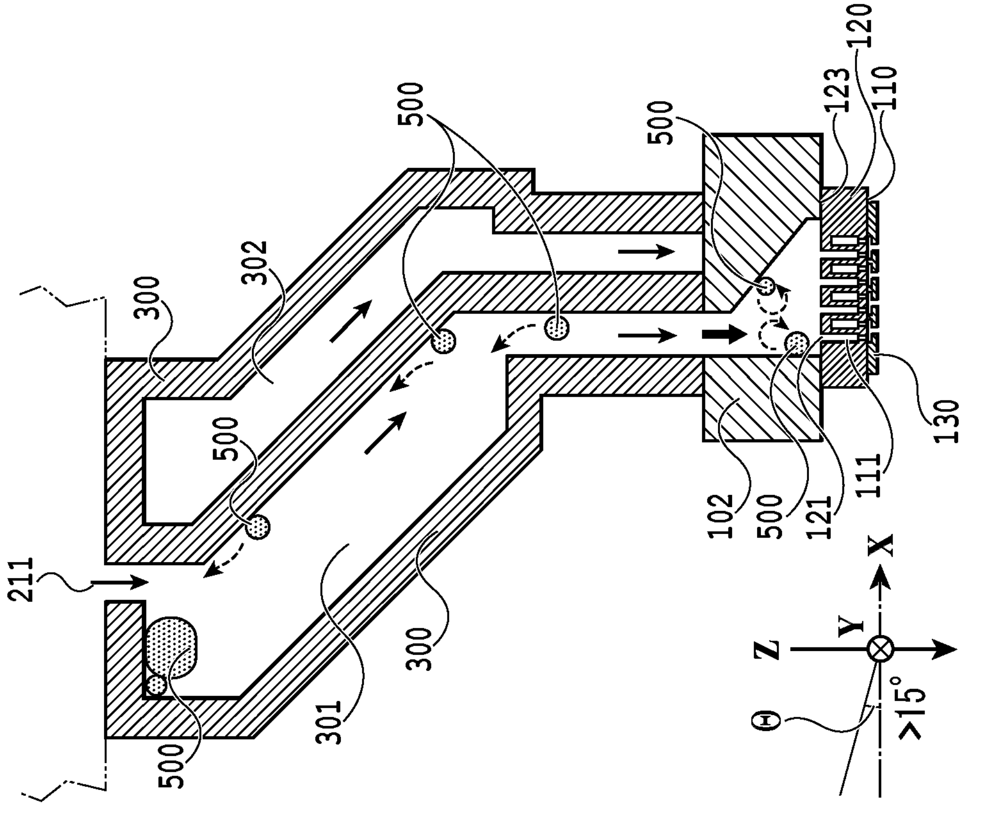
FIG. 12A is a diagram showing a flow of the ink and behaviors of bubbles in a case of using numerous ejection ports.

FIGS. 12A and 12B are diagrams showing the flow of the ink and behaviors of the bubbles 500 in a case of using the majority of the ejection ports shown in FIG. 6. FIG. 12A is a cross-sectional view showing the first ink connection flow passage 310 connected to the pressure control chamber 211, and FIG. 12B is a cross-sectional view showing the second ink connection flow passage 320 connected to the pressure control chamber 221. Positions of the cross-sections in FIGS. 12A and 12B are the same as those in FIGS. 10A and 10B.

In the case of performing the printing by using the majority of the ejection ports, the ink in an amount larger than that in the circulating flow in the state of not performing the printing shown in FIGS. 10A and 10B is supplied to the pressure chambers 113, whereby a large current is generated in each flow passage. Meanwhile, in the case of performing the printing by using the majority of the ejection ports, the circulating flow of the ink in each of the first ink connection flow passage 310 and the second ink connection flow passage 320 is the flow directed to the pressure chambers 113. As a consequence of the increase in ink flow volume, the ink flow velocity is increased overall in the direction toward the pressure chambers 113.

Particularly, in the first ink connection flow passage 310 and the second ink connection flow passage 320 formed from the support member 102 having the relatively small cross-sectional area of each flow passage therein, a fast flow velocity is generated and a dynamic pressure to be applied to the bubbles 500 is increased, whereby the bubbles 500 are more likely to flow into the pressure chambers 113. Meanwhile, in the case of the present embodiment, ejection energy in each pressure chamber 113 is generated by using thermal energy from the heater 115. Accordingly, the temperature of the printing element board 110 is increased along with the ejection. As a consequence, the inside of the circulating flow passages formed in the support member 102 and the printing element board 110 reaches a relatively high temperature, and the gas dissolved in the ink is more likely to be supersaturated and prone to generate the bubbles 500.

In the case of performing the printing by using the majority of the ejection ports as described above, the bubbles 500 have to be moved to the first bubble reservoir unit 301 or the second bubble reservoir unit 302 by regularly establishing the state of circulation at the time of not performing the printing or by stopping the circulation depending on the amount of ejection or an ejection period of the ink. This period to move the bubbles 500 may involve suspension of the printing as mentioned above, and may therefore deteriorate printing productivity. Accordingly, it is desirable to set each ceiling surface with an angle close to 90 degrees with which 100% of the component force of the buoyancy of the bubbles 500 can be used for the migration force in order to reduce the period to move the bubbles 500.

As a modified example, there is a case of mounting a heater on the printing element board 110 in order to adjust the temperature of the ink, and a resin material having low thermal conductivity may be used for the support member 102 while focusing on a temperature adjustment rate. In that case, a location where the bubbles are generated by the heat is limited to a portion in the vicinity of the Si substrate 120.

Meanwhile, the common supply flow passage 111 provided in the printing element board 110 is formed in accordance with Si substrate processing techniques. For this reason, it is difficult to secure a sufficient angle relative to the surface provided with the ejection ports. Moreover, since the cross-sectional area of each flow passage is very small, it is difficult to guide the bubbles 500 to the first bubble reservoir unit 301 by using the buoyancy against the circulating flow. Accordingly, it is necessary to discharge the bubbles 500 generated inside the common supply flow passage 111 regularly out of pressure chambers 113 through the ejection ports by suctioning and the like depending on the amount of ejection of the ink and on a printing period. Nonetheless, the volume of the ink in the common supply flow passage 111 is very small so that the amount of the waste ink can be minimized.

Figure 13B:
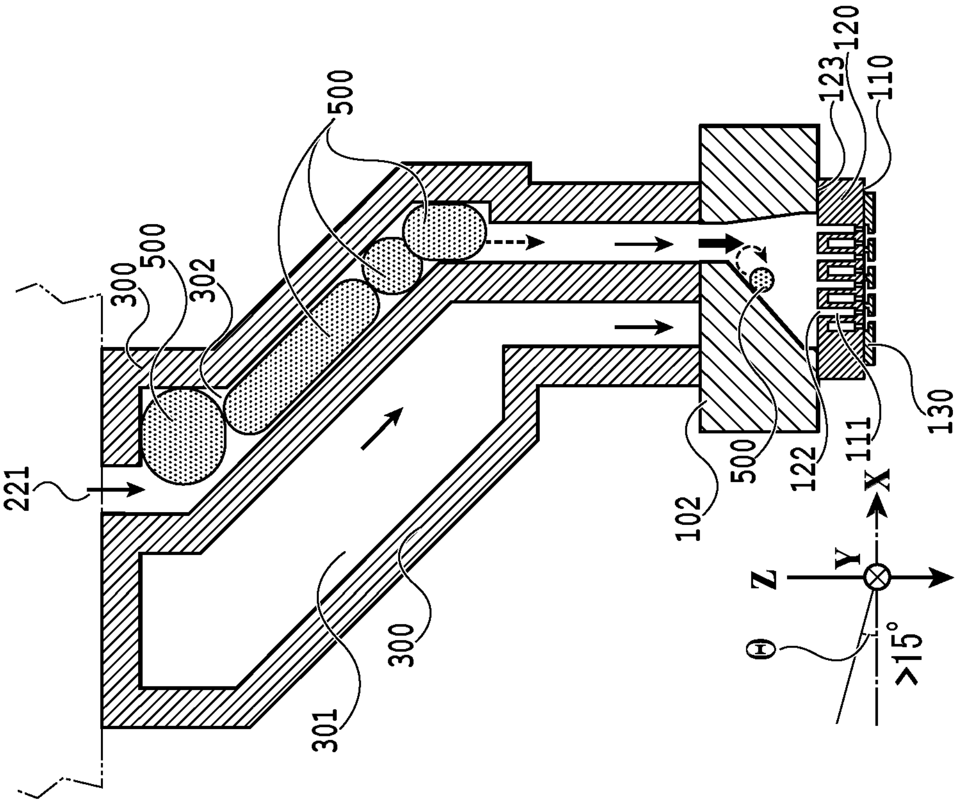
FIG. 13B is another cross-sectional view showing the first bubble reservoir unit and the second bubble reservoir unit.
Figure 13A:
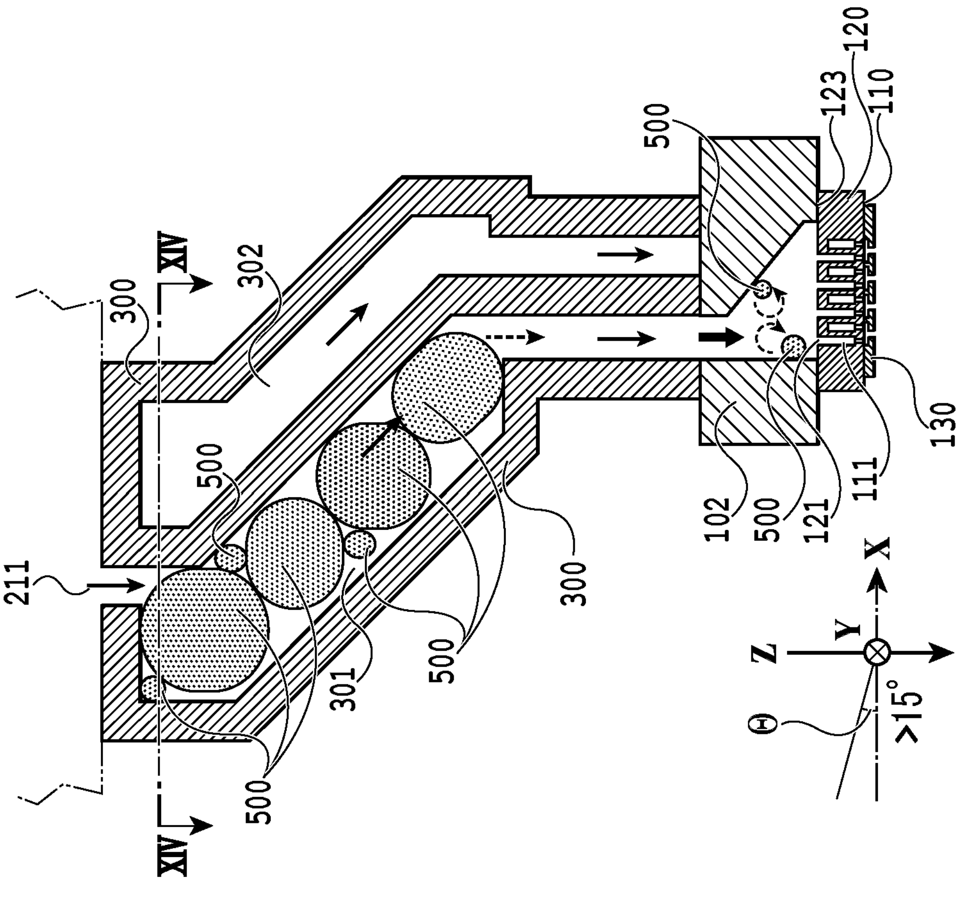
FIG. 13A is a cross-sectional view showing a first bubble reservoir unit and a second bubble reservoir unit.
Figure 14:
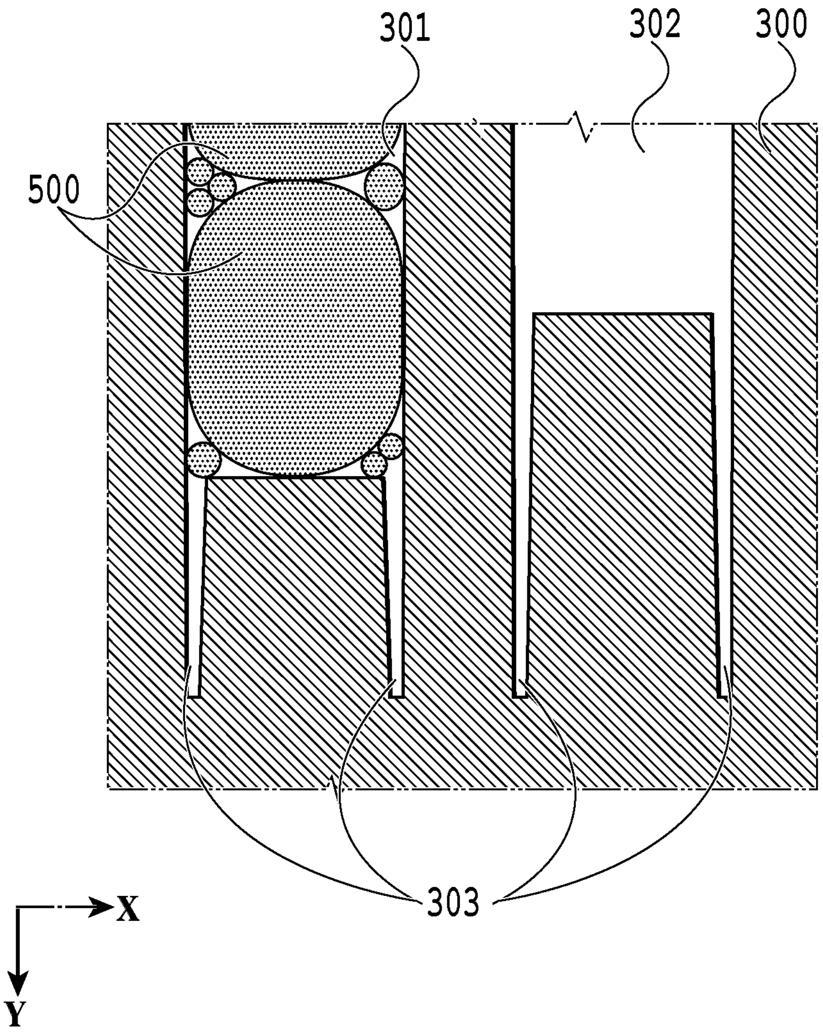
FIG. 14 is a cross-sectional view taken along the XIV-XIV line in FIG. 13A.

FIG. 13A is a cross-sectional view showing the first bubble reservoir unit 301 in the case of reserving a large amount of the bubbles 500, and FIG. 13B is a cross-sectional view showing the second bubble reservoir unit 302 in the case of reserving a large amount of the bubbles 500. Positions of the cross-sections in FIGS. 13A and 13B are the same as those in FIGS. 10A and 10B. FIG. 14 is a cross-sectional view taken along the XIV-XIV line in FIG. 13A, which is a view showing slits 303 in the first bubble reservoir unit 301 and the second bubble reservoir unit 302. In the case where the bubbles 500 are bonded to one another into such a size that substantially occludes the cross-section of the flow passage, the bubbles 500 are drifted to the pressure chambers 113 due to an increase in drag attributed to the ink flow.

However, the cross-sectional areas of the first bubble reservoir unit 301 and the second bubble reservoir unit 302 inclusive of the ceilings thereof are larger than a minimum cross-sectional area portion inside each bubble reservoir unit. In addition, each flow passage wall is provided with the slits 303 along the direction of flow of the ink. Each slit 303 is formed thin enough for not being clogged with the bubble 500. As a consequence, a relative ink flow velocity in each bubble reservoir unit is slowed down so that the ink can be fed out of the slits 303 without moving the bubbles 500. In this way, it is possible to keep the bubbles 500 from flowing into the pressure chambers 113. In the present embodiment, each slit has a shape of a groove with a width in a range from 0.2 to 0.5 mm, and adopts such a structure that the bubbles 500 reserved and bonded together can hardly occlude the slits 303.

Even in the case where the slits 303 are provided as described above, a certain amount of the bubbles 500 may be reserved in the first bubble reservoir unit 301 and the second bubble reservoir unit 302. In the case where the bubbles 500 reach the flow passage with the small cross-sectional area that increases the flow velocity, the bubbles 500 are prone to flow into the pressure chambers 113 due to the ink dynamic pressure, thereby causing an ejection error. For this reason, in the case where a certain amount of the bubbles 500 are reserved, it is necessary to conduct a recovery operation such as suctioning from the ejection ports in order to discharge the bubbles 500 to the outside. A suction recovery device and the like configured to perform a recovery operation by suctioning and so forth is a structure that has been widely adopted by ink jet printers for obtaining printing stability. This is not a new structure for removing the bubbles 500 stored in the first bubble reservoir unit 301 and the second bubble reservoir unit 302.

Figure 15:
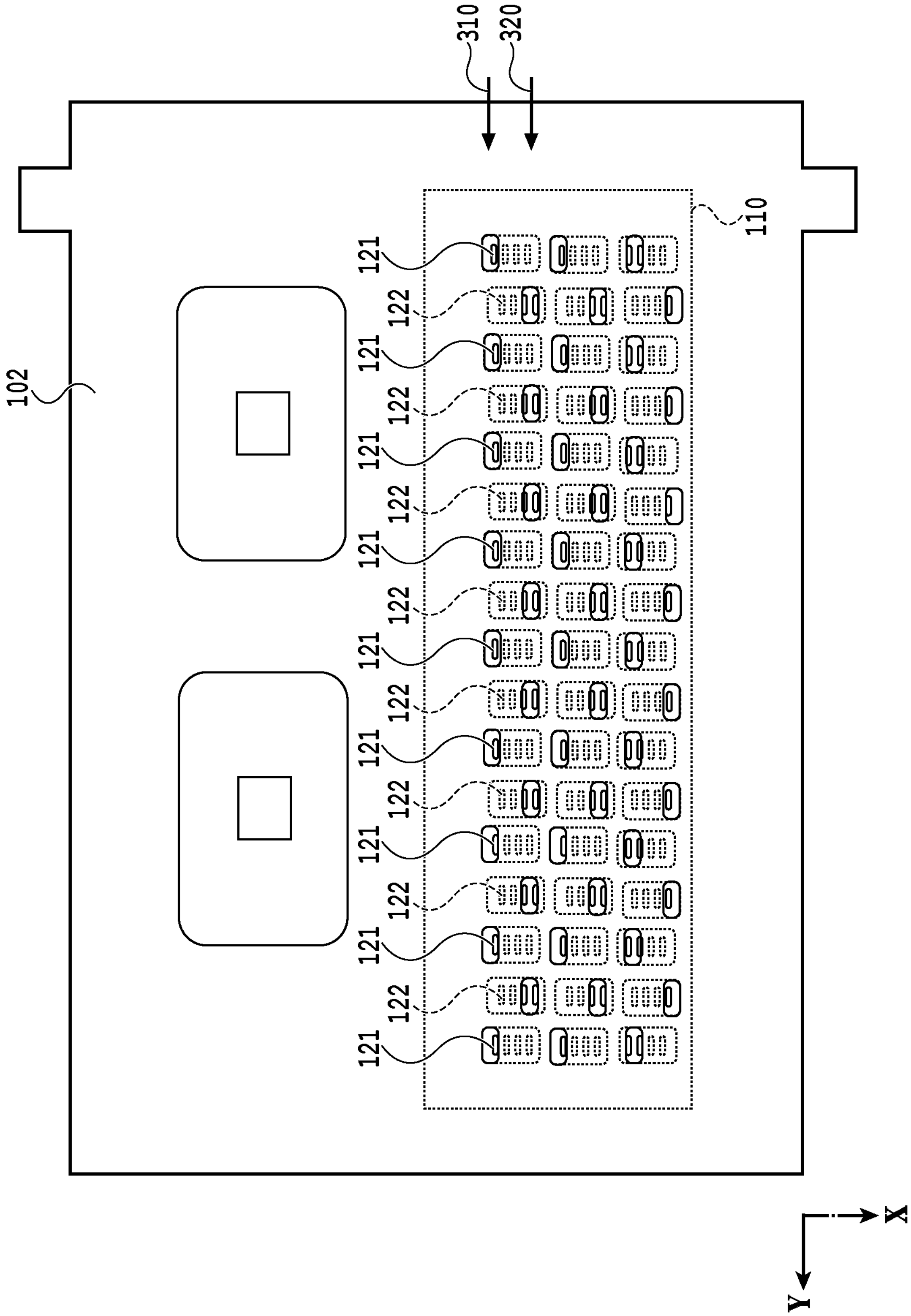
FIG. 15 is a diagram showing a cross-section taken along the XV-XV line in FIG. 7.

FIG. 15 is a diagram showing a cross-section taken along the XV-XV line in FIG. 7. The first bubble reservoir unit 301 and the second bubble reservoir unit 302 can move the generated bubbles to the ceilings by securing the cross-sectional areas as large as possible. Accordingly, it is desirable to form the first bubble reservoir unit 301 and the second bubble reservoir unit 302 with the increased cross-areas of the flow passages to portions in the vicinity of the printing element board 110 where the bubbles 500 are prone to be generated.

In the case of alternately disposing the common supply flow passage openings 121 at nine positions in the direction of the ejection port rows and the common collection flow passage openings 122 at eight positions in the same direction as in the present embodiment, the respective openings are joined to one another by using a flow passage that has a length equivalent to a long side in the y direction equal to or more than a length between two end portions of each ejection port row. In this case, branches need to be disposed for the purpose of supply to the respective openings arranged at narrow pitches. In the present embodiment, as shown in the cross-sectional views of FIGS. 8A and 8B, each portion to be connected to the printing element board 110 is formed into a branch unit having a triangular shape provided with an oblique side that is inclined in the x direction being the scanning direction. The oblique side in the triangular shape of the first ink connection flow passage 310 to be connected to the common supply flow passage opening 121 and the oblique side in the triangular shape of the second ink connection flow passage 320 to be connected to the common collection flow passage opening 122 are arranged in opposite directions to each other.

As described above, there are provided the first bubble reservoir unit that connects a liquid feeding mechanism to the supply flow passage communicating with the pressure chamber, and the second bubble reservoir unit that connects the liquid feeding mechanism to the collection flow passage communicating with the pressure chamber, and the volume of the first bubble reservoir unit is set larger than the volume of the second bubble reservoir unit. Thus, it is possible to provide the liquid ejection head and the liquid ejection apparatus, which suppress the occurrence of an ejection error without increasing a size of the apparatus.

Second Embodiment

A second embodiment of the present disclosure will be described below with reference to the drawings. Note that a basic configuration of the present embodiment is the same as the configuration of the first embodiment, and characteristic features of the present embodiment will therefore be discussed below.

Figure 16B:
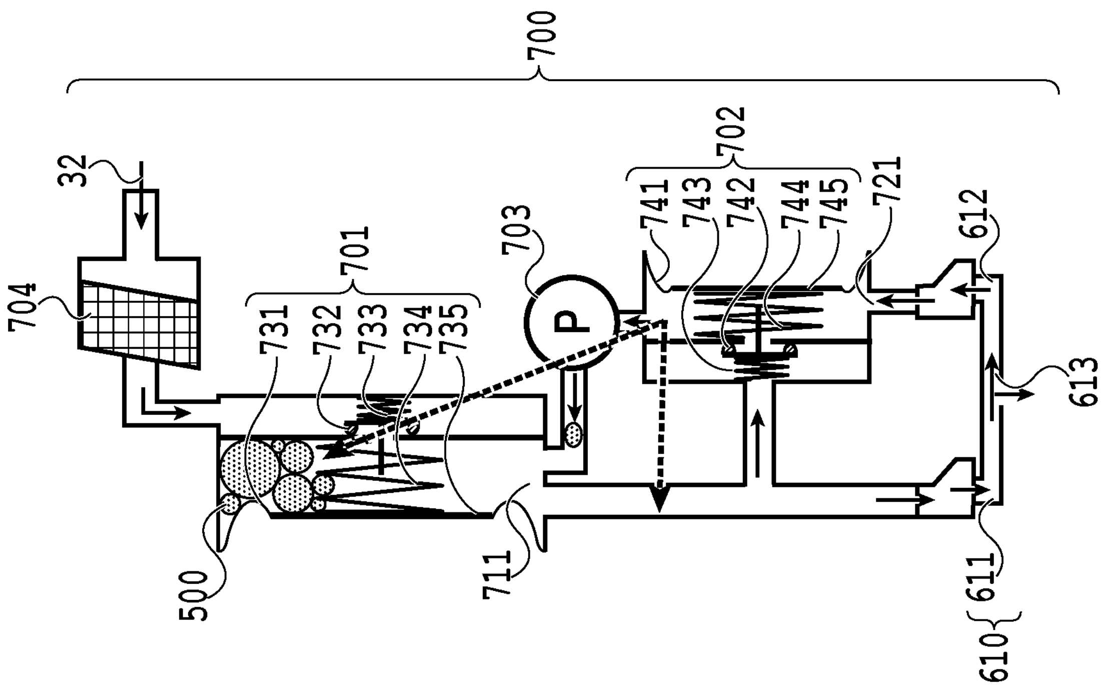
FIG. 16B is another schematic diagram showing the circulation flow passage.
Figure 16A:
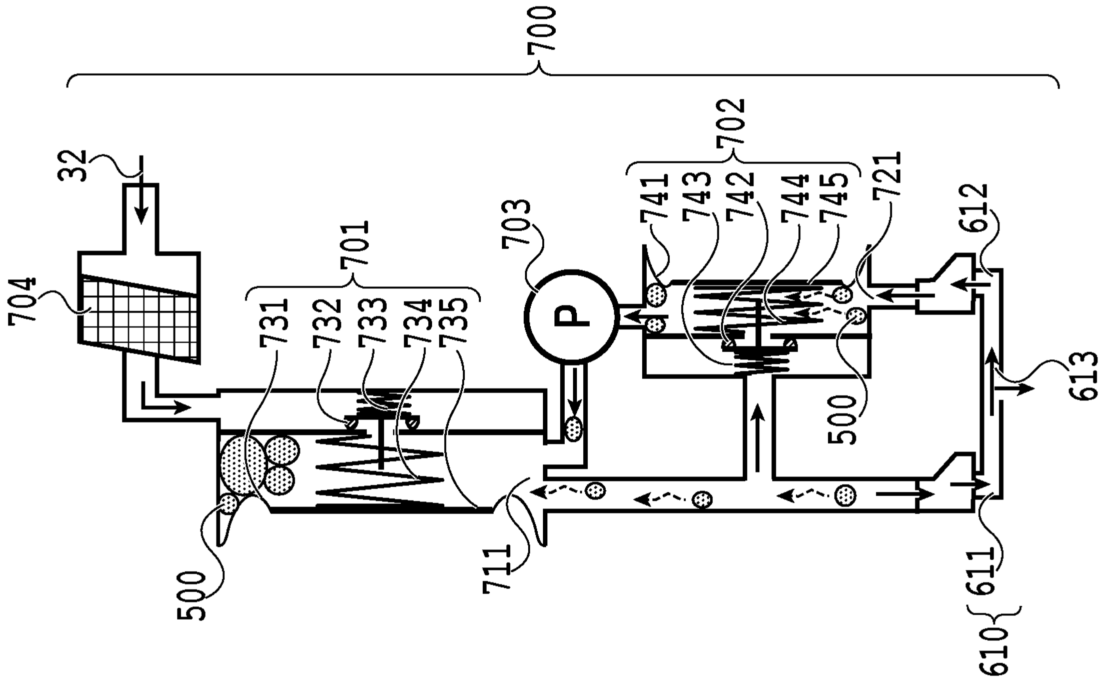
FIG. 16A is a schematic diagram showing the circulation flow passage.

FIG. 16A is a schematic diagram showing the circulation flow passage in the state of ink ejection, and FIG. 16B is a schematic diagram showing the circulation flow passage in the case of continuing the circulation for a while without generation of bubbles. The liquid ejection head 1000 of the present embodiment includes a first bubble reservoir unit-cum-first pressure adjustment chamber 711 and a second bubble reservoir unit-cum-second pressure adjustment chamber 721. In other words, each pressure adjustment chamber is also configured to serve as the bubble reservoir unit.

The circulating flow is completed inside the ink flow passages of the liquid ejection head 1000. Accordingly, the bubbles 500 generated inside the flow passages of the liquid ejection head 1000 should be present somewhere in the circulating flows. The bubbles 500 are generated by: foaming caused at the time of ink filling, along with the ink flow, and the like; supersaturation of a gas dissolved in the ink associated with a rise in temperature or reduction in pressure inside the liquid ejection head 1000; and the like. In the case where the bubbles 500 flow into any of pressure chambers 613, the bubbles 500 are prone to cause an ejection error of the ink that may lead to an image error. Accordingly, the bubbles 500 are temporarily reserved in the first bubble reservoir unit-cum-first pressure adjustment chamber 711 and the second bubble reservoir unit-cum-second pressure adjustment chamber 721 which are provided at positions located away from the pressure chambers 613 so as not to let the bubbles 500 flow into the pressure chambers 613. Then, the bubbles 500 are discharged out of the liquid ejection head 1000 by regular suctioning from the ejection ports.

Meanwhile, the bubbles 500 reserved in the second bubble reservoir unit-cum-second pressure adjustment chamber 721 are moved by the circulating flow to the first bubble reservoir unit-cum-first pressure adjustment chamber 711 located downstream of the circulation pump (see FIG. 16B). The volume on the downstream of the circulation pump is set larger than that of the flow passage on the upstream of the circulation pump so that the bubbles 500 in the first bubble reservoir unit-cum-first pressure adjustment chamber 711 can be kept from reaching the pressure chambers 613 even in the case where the bubbles 500 are moved to the supply flow passage side on the downstream of the circulation pump as mentioned above. It is desirable to increase the portion that can reserve the bubbles by increasing the volume as described above. Here, the larger flow passage volume increases the capability of reserving the bubbles 500. Nevertheless, the larger flow passage volume is not always desirable, and the total flow passage volume and the difference in volume between the upstream and the downstream of the circulation pump need to be determined in consideration of the pressure loss, the initial amount of the gas, the generated amount of the gas, and so forth.

Here, a connection flow passage between a common supply flow passage 611 and the first bubble reservoir unit-cum-first pressure adjustment chamber 711 as well as a communication flow passage between a common collection flow passage 612 and the second bubble reservoir unit-cum-second pressure adjustment chamber 721 are formed to extend in the vertical direction so that the bubbles 500 can move in the anti-gravitational direction by using buoyancy. Alternatively, each of the connection flow passages mentioned above preferably includes an inner wall in which a component force of a normal vector of a ceiling surface located vertically above has a component in the gravitational direction (the z direction).

REFERENCE EXAMPLES

More detailed reference examples of the above-mentioned liquid ejection apparatus will be described.

Pressure Adjustment Unit

Figure 17C:
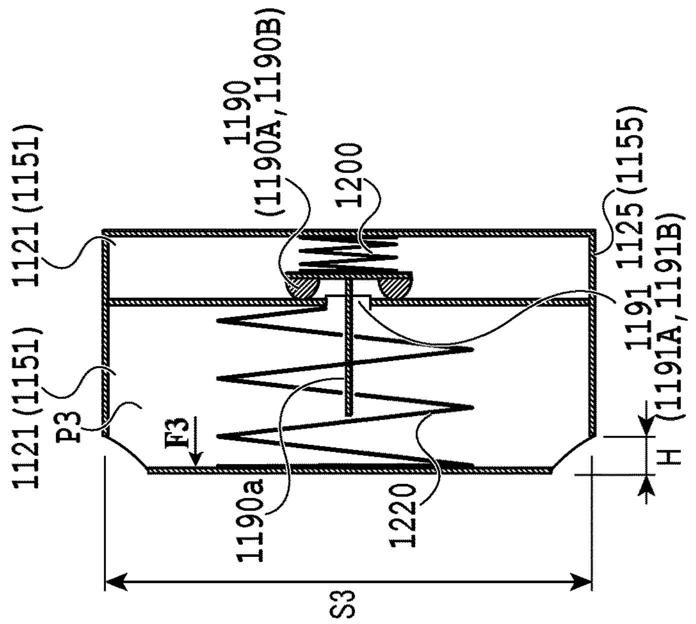
FIG. 17C is another diagram showing the example of the pressure adjustment unit.
Figure 17B:
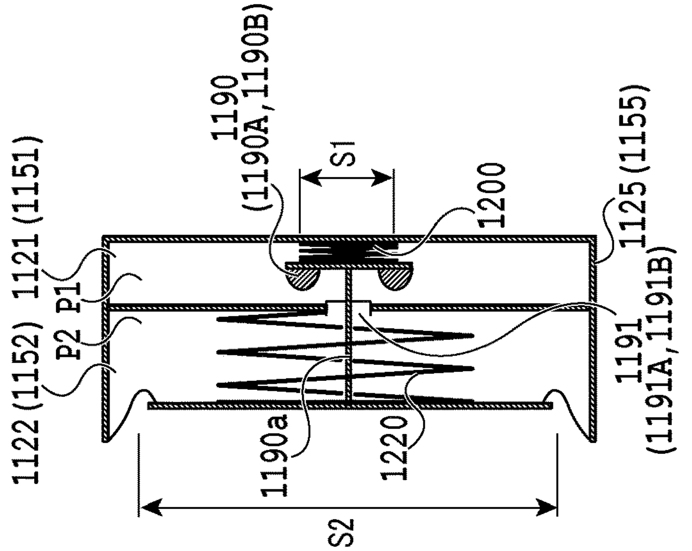
FIG. 17B is another diagram showing the example of the pressure adjustment unit.
Figure 17A:
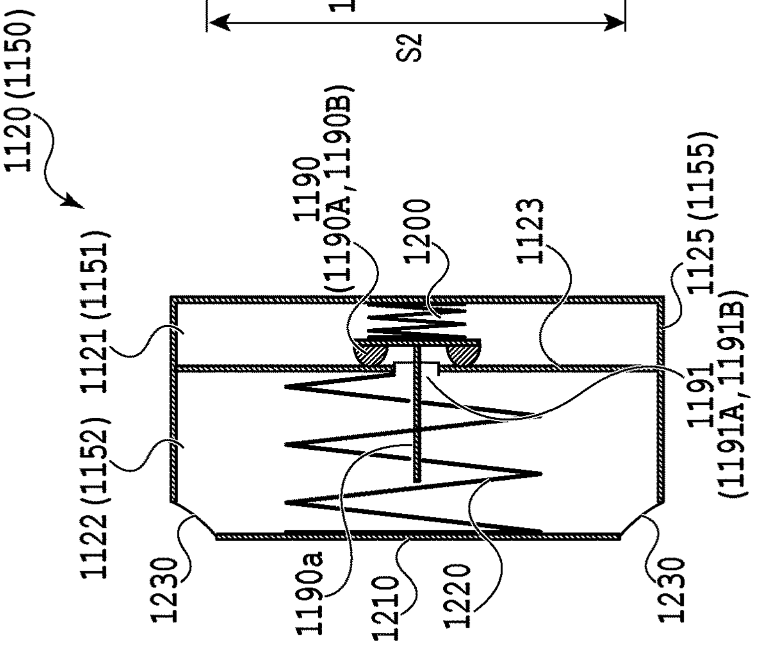
FIG. 17A is a diagram showing an example of a pressure adjustment unit.

FIGS. 17A to 17C are diagrams showing an example of a pressure adjustment unit. A configuration and operation of the pressure adjustment unit (a first pressure adjustment unit 1120 or a second pressure adjustment unit 1150) that is built in the above-described liquid ejection head 1000 will be described in more detail with reference to FIGS. 17A to 17C. Note that the first pressure adjustment unit 1120 and the second pressure adjustment unit 1150 have substantially the same structure. Accordingly, the following description will be given of the first pressure adjustment unit 1120 as an example, and the second pressure adjustment unit 1150 will be explained by citing reference signs of portions corresponding to those of the first pressure adjustment unit in FIGS. 17A to 17C. In the case of the second pressure adjustment unit 1150, a first valve chamber 1121 to be described below will be translated into a second valve chamber 1151, and a first pressure control chamber 1122 to be described below will be translated into a second pressure control chamber 1152.

The first pressure adjustment unit 1120 includes the first valve chamber 1121 and the first pressure control chamber 1122 formed inside a cylindrical housing 1125. The first valve chamber 1121 and the first pressure control chamber 1122 are separated from each other by a partition wall 1123 provided inside the cylindrical housing 1125. Nevertheless, the first valve chamber 1121 communicates with the first pressure control chamber 1122 through a communication port 1191 formed in the partition wall 1123. The first valve chamber 1121 is provided with a valve 1190 that switches between communication and block between the first valve chamber 1121 and the first pressure control chamber 1122 with the communication port 1191. The valve 1190 is held at a position opposed to the communication port 1191 by using a valve spring 1200, and the valve 1190 is configured to be capable of coming into close contact with the partition wall 1123 by using a biasing force of the valve spring 1200. As a consequence of bringing the valve 1190 into close contact with the partition wall 1123, the flow of the ink through the communication port 1191 is blocked. Here, a portion of the valve 1190 to come into contact with the partition wall 1123 is preferably made of an elastic material in order to enhance close contact with the partition wall 1123. Meanwhile, a valve shaft 1190*a* to be inserted into the communication port 1191 is provided in a projecting manner at a central portion of the valve 1190. By pressing this valve shaft 1190$a$ against the biasing force of the valve spring 1200, the valve 1190 is detached from the partition wall 1123 so as to enable the ink to flow through the communication port 1191. In the following description, a state where the flow of the ink through the communication port 1191 is blocked by the valve 1190 will be referred to as a "closed state" while a state where the ink can flow through the communication port 1191 will be referred to as an "open state".

An opening of the cylindrical housing 1125 is occluded by a flexible member 1230 and a pressing plate 1210. The flexible member 1230, the pressing plate 1210, peripheral walls of the housing 1125, and the partition wall 1123 form the first pressure control chamber 1122. The pressing plate 1210 is made displaceable along with displacement of the flexible member 1230. Although materials of the pressing plate 1210 and the flexible member 1230 are not limited, it is possible to form the pressing plate 1210 from a resin molded component and to form the flexible member 1230 from a resin film, for example. In this case, the pressing plate 1210 can be fixed to the flexible member 1230 by heat sealing.

A pressure adjustment spring 1220 (a biasing member) is provided between the pressing plate 1210 and the partition wall 1123. As shown in FIG. 17A, the pressing plate 1210 and the flexible member 1230 are biased in a direction to spread an inner volume of the first pressure control chamber 1122 by a biasing force of the pressure adjustment spring 1220. Meanwhile, in a case where the pressure inside the first pressure control chamber 1122 is reduced, the pressing plate 1210 and the flexible member 1230 are displaced in a direction to reduce the inner volume of the first pressure control chamber 1122 against the pressure of the pressure adjustment spring 1220. Then, in a case where the inner volume of the first pressure control chamber 1122 is reduced to a predetermined amount, the pressing plate 1210 comes into contact with the valve shaft 1190$a$ of the valve 1190. Thereafter, as the inner volume of the first pressure control chamber 1122 is reduced further, the valve 1190 moves together with the valve shaft 1190$a$ against the biasing force of the valve spring 1200, thereby being detached from the partition wall 1123. In this way, the open state (a state in FIG. 17B) of the communication port 1191 is established.

In the present embodiment, connection setting in the circulation path is carried out such that the pressure in the first valve chamber 1121 is higher than the pressure in the first pressure control chamber 1122 in the case where the communication port 1191 is set to the open state. Hence, in the case where the communication port 1191 is set to the open state, the ink flows from the first valve chamber 1121 into the first pressure control chamber 1122. This inflow of the ink displaces the flexible member 1230 and the pressing plate 1210 in the direction to increase the inner volume of the first pressure control chamber 1122. As a consequence, the pressing plate 1210 is detached from the valve shaft 1190$a$ of the valve 1190 and the valve 1190 comes into close contact with the partition wall 1123 by the biasing force of the valve spring 1200. Thus, the closed state (a state in FIG. 17C) of the communication port 1191 is established.

As described above, according to the first pressure adjustment unit 1120 of the present embodiment, the ink flows in from the first valve chamber 1121 through the communication port 1191 in the case where the pressure inside the first pressure control chamber 1122 is reduced to the predetermined pressure or below (in the case where the negative pressure is increased, for example). Thus, the pressure in the first pressure control chamber 1122 is kept from being reduced further. In this way, the first pressure control chamber 1122 is controlled such that the pressure therein is maintained at the pressure within a prescribed range.

Next, the pressure in the first pressure control chamber 1122 will be described further in detail.

Let us consider the state (the state in FIG. 17B) where the flexible member 1230 and the pressing plate 1210 are displaced in accordance with the pressure in the first pressure control chamber 1122 as mentioned above, and the closed state of the communication port 1191 is established by the pressing plate 1210 coming into contact with the valve shaft 1190$a$. In this instance, a relation of forces that act on the pressing plate 1210 is expressed by the following formula 1:

$$P2 \times S2 + F2 + (P1 - P2) \times S1 + F1 = 0 \quad \text{Formula 1.}$$

In addition, rearrangement of the formula 1 with respect to P2 gives the following formula:

$$P2 = -(F1 + F2 + P1 \times S1)/(S2 - S1) \quad \text{Formula 2,}$$

where

P1: a pressure (a gauge pressure) in the first valve chamber 1121,

P2: a pressure (a gauge pressure) in the first pressure control chamber 1122, F1: a spring force of the valve spring 1200, F2: a spring force of the pressure adjustment spring 1220, S1: a pressure receiving area of the valve 1190, and S2: a pressure receiving area of the pressing plate 1210.

Here, regarding the spring force F1 of the valve spring 1200 and the spring force F2 of the pressure adjustment spring 1220, a direction to press the valve 1190 and the pressing plate 1210 is determined to be positive (a leftward direction in FIG. 17B). Meanwhile, regarding the pressure P1 in the first valve chamber 1121 and the pressure P2 in the first pressure control chamber 1122, the pressure P1 is configured to satisfy a relation $P1 \geq P2$.

The pressure P2 in the first pressure control chamber 1122 in the case where the open state of the communication port 1191 is established is determined by the formula 2. In the case where the open stat of the communication port 1191 is established, the ink flows from the first valve chamber 1121 into the first pressure control chamber 1122 by the configuration to satisfy the relation $P1 \geq P2$. As a consequence, the pressure P2 in the first pressure control chamber 1122 is not reduced further and the pressure P2 is maintained at the pressure within the predetermined range.

On the other hand, in the case where the closed state of the communication port 1191 is established by a state of non-contact between the pressing plate 1210 and the valve shaft 1190$a$ as shown in FIG. 17C, a relation of the forces that act on the pressing plate 1210 is expressed by the following formula 3:

$$P3 \times S3 + F3 = 0 \quad \text{Formula 3.}$$

Here, rearrangement of the formula 3 with respect to P3 gives the following formula:

$$P3 = -F3/S3 \quad \text{Formula 4,}$$

where

F3: a pressure adjustment spring 1220 in the state of non-contact between the pressing plate 1210 and the valve shaft 1190$a$;

P3: a pressure (a gauge pressure) in the first pressure control chamber 1122 in the state of non-contact between the pressing plate 1210 and the valve shaft 1190$a$; and S3: a pressure receiving area of the pressing plate 1210 in the state of non-contact between the pressing plate 1210 and the valve shaft 1190*a*.

Here, FIG. 17C represents a state where the pressing plate 1210 and the flexible member 1230 are displaced to a displaceable limit in the rightward direction in FIG. 17C. The pressure P3 in the first pressure control chamber 1122, the spring force F3 of the pressure adjustment spring 1220, and the pressure receiving area S3 of the pressing plate 1210 vary in accordance with amounts of displacement of the pressing plate 1210 and the flexible member 1230 in the course of the displacement to the state in FIG. 17C. To be more precise, in the case where the pressing plate 1210 and the flexible member 1230 are located in the leftward direction of FIG. 17C as compared to the state illustrated in FIG. 17C, the pressure receiving area S3 of the pressing plate 1210 is reduced and the spring force F3 of the pressure adjustment spring 1220 is increased. As a consequence, the pressure P3 in the first pressure control chamber 1122 is reduced due to the relation of the formula 4. Accordingly, due to the formula 2 and the formula 4, the pressure in the first pressure control chamber 1122 is gradually increased (that is, the negative pressure is reduced to a value close to a positive pressure side) during a period of transition from the state in FIG. 17B to the state in FIG. 17C. In other words, the pressure in the first pressure control chamber 1122 is gradually increased during the period in which the pressing plate 1210 and the flexible member 1230 are gradually displaced in the rightward direction from the state where the communication port 1191 is in the open state and the inner volume of the first pressure control chamber 1122 eventually reaches the displaceable limit. In short, the negative pressure is gradually reduced.

Circulation Pump

Next, a configuration and operation of a circulation pump 1500 that is built in the above-described liquid ejection head 1000 will be described in more detail with reference to FIGS. 18A, 18B, and 19.

Figure 18A:
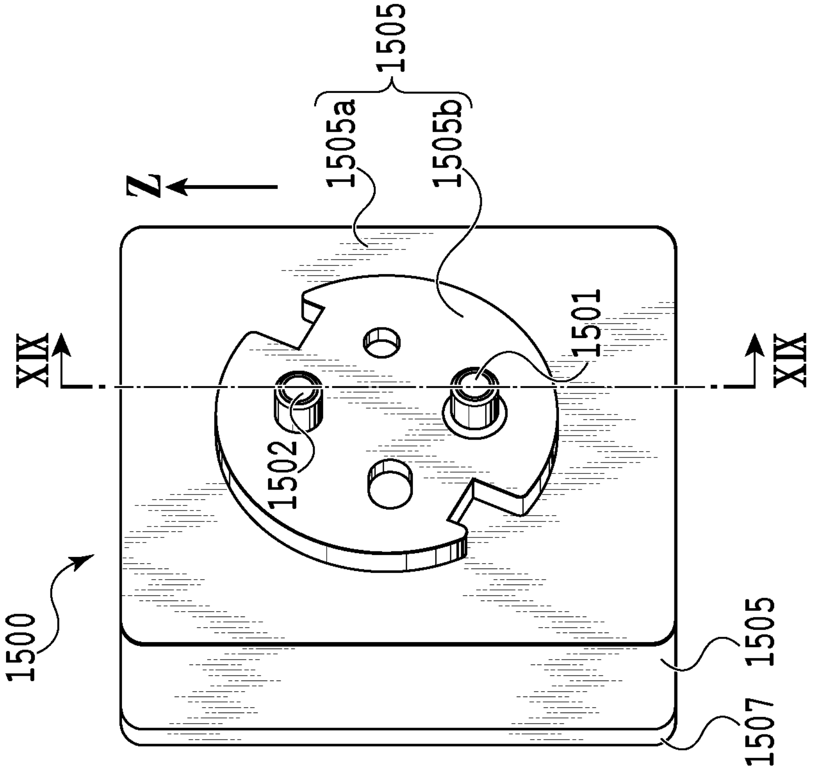
FIG. 18A is an external perspective view of a circulation pump.
Figure 18B:
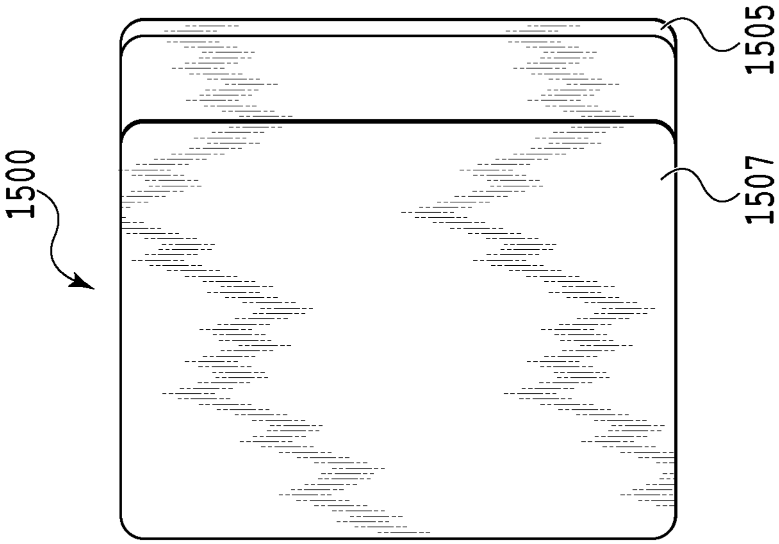
FIG. 18B is another external perspective view of the circulation pump.

FIGS. 18A and 18B are external perspective views of the circulation pump 1500. FIG. 18A is the external perspective view showing a front side of the circulation pump 1500, and FIG. 18B is the external perspective view showing a back side of the circulation pump 1500. An outer shell of the circulation pump 1500 is formed from a pump housing 1505 and a cover 1507 that is fixed to the pump housing 1505. The pump housing 1505 is formed from a housing body 1505*a* and a flow passage connection member 1505*b* that is attached and fixed to an outer surface of the housing body 1505*a*. The housing body 1505*a* and the flow passage connection member 1505*b* are each provided with a pair of through holes at two different positions. The through holes formed at each position communicate with each other. The pair of through holes provided at one position collectively form a pump supply hole 1501 while the pair of through holes provided at another position collectively form a pump discharge hole 1502. The pump supply hole 1501 is connected to a pump inlet flow passage 1170 that is connected to the second pressure control chamber 1152, and the pump discharge hole 1502 is connected to a pump outlet flow passage 1180 that is connected to the first pressure control chamber 1122. The ink supplied from the pump supply hole 1501 passes through a pump chamber 1503 (see FIG. 19) to be described later, and is discharged from the pump discharge hole 1502.

Figure 19:
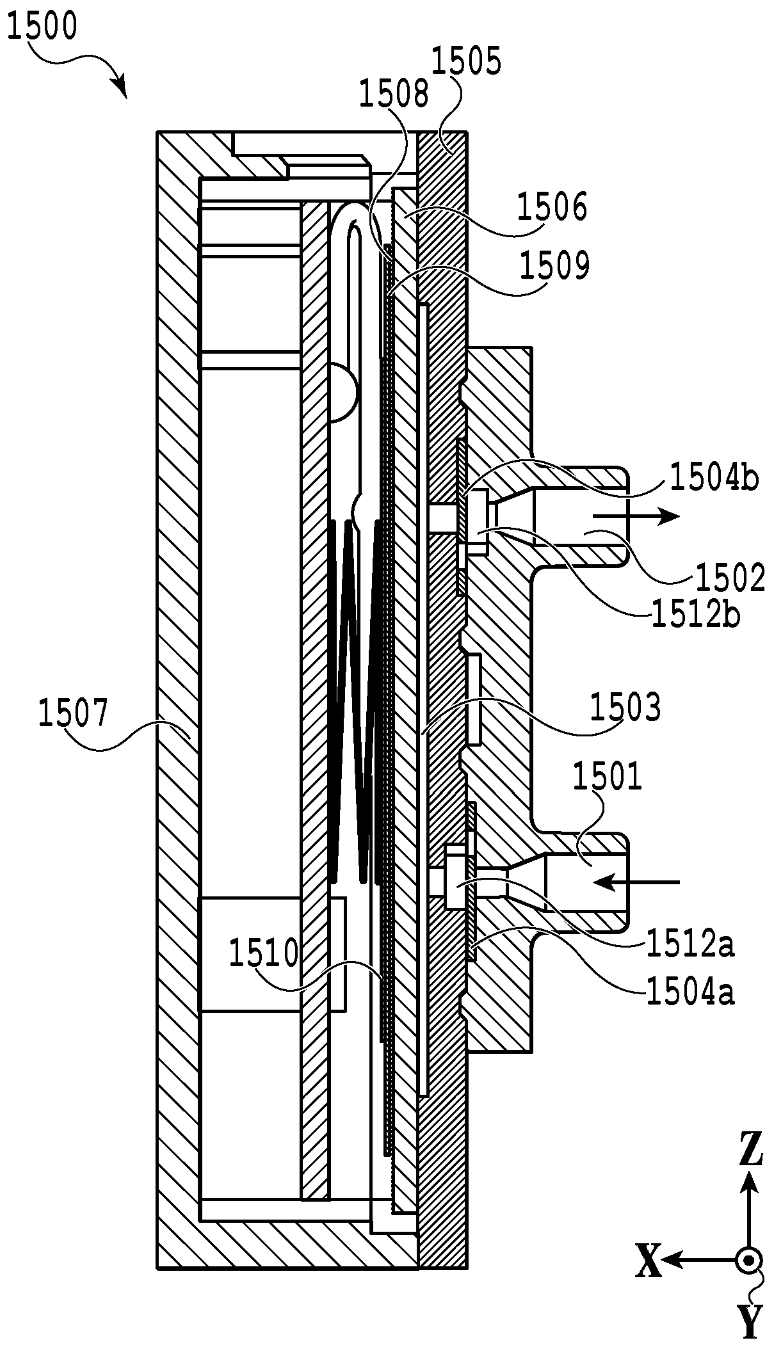
FIG. 19 is a cross-sectional view of the circulation pump taken along the XIX-XIX line.

FIG. 19 is a cross-sectional view of the circulation pump 1500 shown in FIG. 18A, which is taken along the XIX-XIX line therein. A diaphragm 1506 is bonded to an inner surface of the pump housing 1505, and the pump chamber 1503 is formed between this diaphragm 1506 and a recess formed in the inner surface of the pump housing 1505. The pump chamber 1503 communicates with the pump supply hole 1501 and the pump discharge hole 1502, which are formed in the pump housing 1505. Meanwhile, a check valve 1504*a* is provided at an intermediate portion of the pump supply hole 1501, and a check valve 1504*b* is provided at an intermediate portion of the pump discharge hole 1502. To be more precise, the check valve 1504*a* is disposed such that part of the check valve 1504*a* can move leftward in FIG. 19 in a space 1512*a* defined at the intermediate portion of the pump supply hole 1501. Meanwhile, the check valve 1504*b* is disposed such that part of the check valve 1504*b* can move rightward in FIG. 19 in a space 1512*b* defined at the intermediate portion of the pump discharge hole 1502.

In the case where the pressure in the pump chamber 1503 is reduced by an increase in volume of the pump chamber 1503 along with displacement of the diaphragm 1506, the check valve 1504*a* is detached (that is, moves leftward in FIG. 19) from an opening of the pump supply hole 1501 in the space 1512*a*. The detachment of the check valve 1504*a* from the opening of the pump supply hole 1501 in the space 1512*a* establishes the open state that enables the flow of the ink through the pump supply hole 1501. On the other hand, in the case where the pressure in the pump chamber 1503 is increased by a decrease in volume of the pump chamber 1503 along with the displacement of the diaphragm 1506, the check valve 1504*a* comes into close contact with a wall surface around the opening of the pump supply hole 1501. As a consequence, the closed state is established to block the flow of the ink through the pump supply hole 1501.

Meanwhile, in the case where the pressure in the pump chamber 1503 is reduced, the check valve 1504*b* comes into close contact with a wall surface around an opening of the pump housing 1505, and the closed state is established to block a flow of the ink through the pump discharge hole 1502. On the other hand, in the case where the pressure in the pump chamber 1503 is increased, the check valve 1504*b* is detached (that is, moves rightward in FIG. 19) from the opening of the pump housing 1505 and moves toward the space 1512*b*, thus enabling the flow of the ink through the pump discharge hole 1502.

Here, a material of the respective check valves 1504*a* and 1504*b* only needs to have a deformable property in accordance with the pressure inside the pump chamber 1503. The check valves can be formed from an elastic member such as EPDM and an elastomer, or from a film or a thin plate of polypropylene and the like. However, the applicable materials are not limited only to these materials.

As described above, the pump chamber 1503 is formed by bonding the pump housing 1505 to the diaphragm 1506. Accordingly, the pressure in the pump chamber 1503 varies with the deformation of the diaphragm 1506. For example, the pressure in the pump chamber 1503 is increased in the case where the volume of the pump chamber 1503 is reduced by the displacement of the diaphragm 1506 toward the pump housing 1505 (rightward displacement in FIG. 19). Hence, the check valve 1504*b* disposed opposite to the pump discharge hole 1502 is set to the open state and the ink in the pump chamber 1503 is discharged. In this instance, the check valve 1504*a* disposed opposite to the pump supply hole 1501 comes into close contact with the wall surface around the pump supply hole 1501. Accordingly, a reverse flow of the ink from the pump chamber 1503 to the pump supply hole 1501 is suppressed.

On the other hand, the pressure in the pump chamber 1503 is reduced in the case where the diaphragm 1506 is displaced in the direction to expand the pump chamber 1503. Hence, the check valve 1504*a* disposed opposite to the pump supply hole 1501 is set to the open state and the ink is supplied to the pump chamber 1503. In this instance, the check valve 1504*b* disposed at the pump discharge hole 1502 comes into close contact with the wall surface around the opening formed in the pump housing 1505 and occludes the opening. Accordingly, a reverse flow of the ink from the pump discharge hole 1502 to the pump chamber 1503 is suppressed.

As described above, in the circulation pump 1500, the ink is suctioned and discharged by changing the pressure in the pump chamber 1503 with the displacement of the diaphragm 1506. In a case where the bubbles enter the pump chamber 1503 in this instance, the change in pressure in the pump chamber 1503 is diminished by expansion and contraction of the bubbles in spite of the displacement of the diaphragm 1506, whereby a liquid feeding amount is reduced. Therefore, the pump chamber 1503 is disposed parallel to the gravitational force so as to let the bubbles entering the pump chamber 1503 gather easily at an upper part of the pump chamber 1503, and the pump discharge hole 1502 is disposed at a portion above the center of the pump chamber 1503. In this way, it is possible to improve a performance to discharge the bubbles in the pump and to stabilize a flow volume.

Ink Flow in Liquid Ejection Head

Figures 20A, 20B, 20C, 20D, 20E:
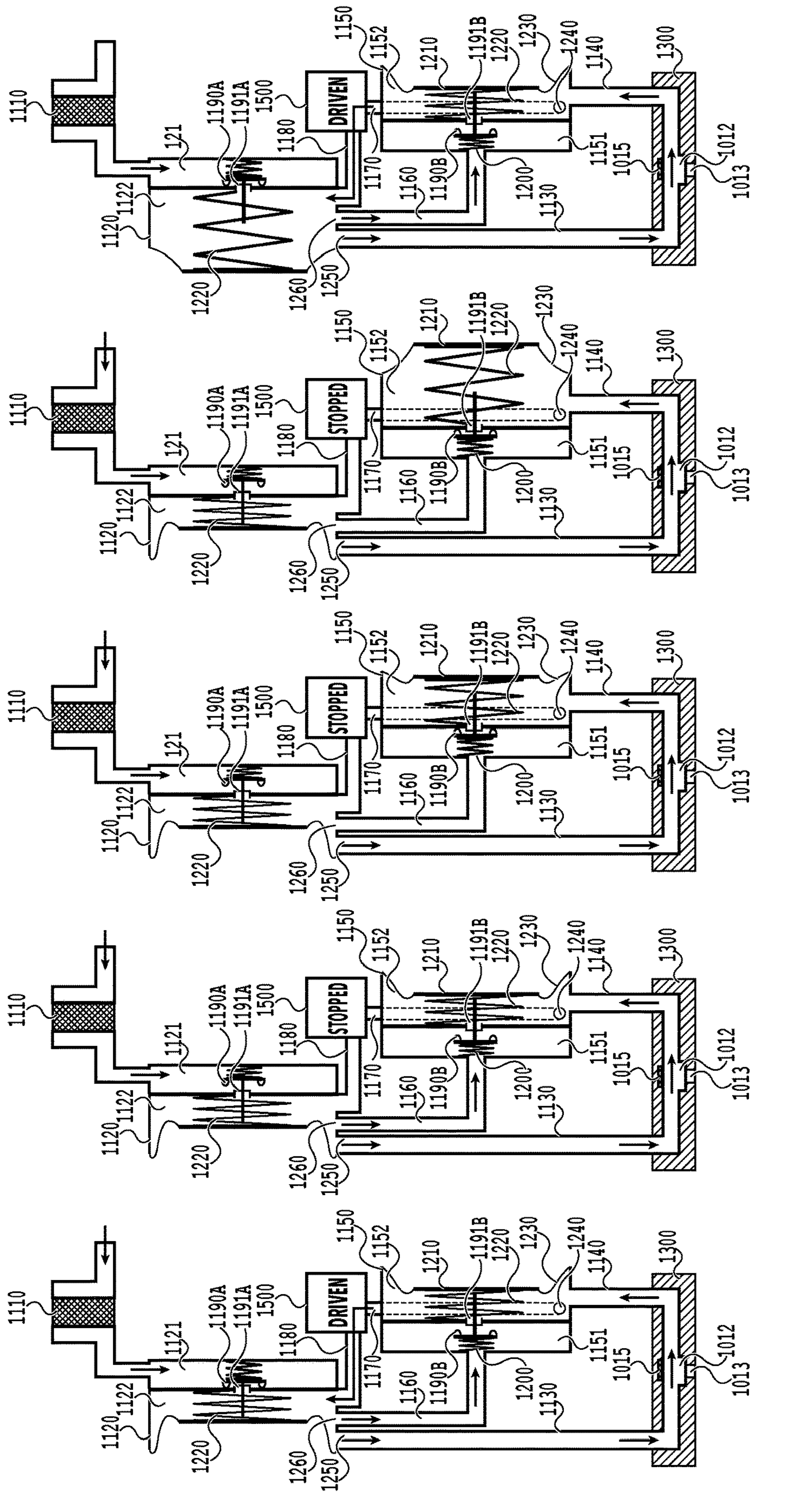
FIG. 20A is a diagram for explaining a flow of an ink in the liquid ejection head.
FIG. 20B is another diagram for explaining the flow of the ink in the liquid ejection head.
FIG. 20C is another diagram for explaining the flow of the ink in the liquid ejection head.
FIG. 20D is another diagram for explaining the flow of the ink in the liquid ejection head.
FIG. 20E is another diagram for explaining the flow of the ink in the liquid ejection head.

FIGS. 20A to 20E are diagrams for explaining the flow of the ink in the liquid ejection head. Circulation of the ink to be carried out in the liquid ejection head 1000 will be described with reference to FIGS. 20A to 20E. In order to explain the circulation path for the ink more clearly, relative positions of the respective structures (the first pressure adjustment unit 1120, the second pressure adjustment unit 1150, the circulation pump 1500, and so forth) are simplified in FIGS. 20A to 20E. For this reason, the relative positions of the structures are different from those of structures in FIG. 28 to be described later. FIG. 20A schematically shows the flow of the ink in a case of carrying out a printing operation to perform printing while ejecting the ink from an ejection port 1013. Note that arrows in FIG. 20A indicate the flow of the ink. In the present embodiment, both an external pump 1021 and the circulation pump 1500 start driving in the case of carrying out the printing operation. Here, the external pump 1021 and the circulation pump 1500 may be driven irrespective of the printing operation. Alternatively, the external pump 1021 and the circulation pump 1500 do not have to be driven in tandem and may be driven independently of each other.

The circulation pump 1500 is in on-state (a driven state) during the printing operation, and the ink flowing out of the first pressure control chamber 1122 flows into a supply flow passage 1130 and a bypass flow passage 1160. The ink that flows into the supply flow passage 1130 passes through an ejection module 1300 and then flows into a collection flow passage 1140. Thereafter, the ink is supplied to the second pressure control chamber 1152.

In the meantime, the ink flowing from the first pressure control chamber 1122 into the bypass flow passage 1160 passes through the second valve chamber 1151 and flows into the second pressure control chamber 1152. The ink flowing into the second pressure control chamber 1152 passes through the pump inlet flow passage 1170, the circulation pump 1500, and the pump outlet flow passage 1180, and then flows into the first pressure control chamber 1122 again. In this instance, a control pressure by the first valve chamber 1121 is set higher than a control pressure of the first pressure control chamber 1122 based on the relation of the above-mentioned formula 2. Accordingly, the ink in the first pressure control chamber 1122 is supplied to the ejection module 1300 through the supply flow passage 1130 again without flowing into the first valve chamber 1121. The ink flowing into the ejection module 1300 passes through the collection flow passage 1140, the second pressure control chamber 1152, the pump inlet flow passage 1170, the circulation pump 1500, and the pump outlet flow passage 1180, and then flows into the first pressure control chamber 1122 again. Thus, the ink circulation is carried out as described above, which is completed inside the liquid ejection head 1000.

In the above-described ink circulation, an amount of circulation (the flow volume) of the ink in the ejection module 1300 is determined by a differential pressure between the control pressures of the first pressure control chamber 1122 and the second pressure control chamber 1152. Then, this differential pressure is set to achieve such an amount of circulation that can suppress an increase in viscosity of the ink in the vicinity of each ejection port in the ejection module 1300. Moreover, the ink in an amount equivalent to an amount consumed by the printing is supplied from the ink tank 2 to the first pressure control chamber 1122 through a filter 1110 and the first valve chamber 1121. A mechanism to supply the ink in the amount of consumption will be described below in detail. The pressure inside the first pressure control chamber is reduced in accordance with the decrease of the ink in the circulation path in the amount equivalent to the amount of the ink consumed by the printing. As a consequence, the ink in the first pressure control chamber 1122 is decreased as well. Along with the decrease of the ink in the first pressure control chamber 1122, the inner volume of the first pressure control chamber 1122 is reduced. Due to this reduction in inner volume of the first pressure control chamber 1122, a communication port 1191A is set to the open state and the ink is supplied from the first valve chamber 1121 to the first pressure control chamber 1122. A pressure loss occurs in this supplied ink in the process of passage from the first valve chamber 1121 through the communication port 1191A, and the ink at a positive pressure is turned into a state of a negative pressure as a consequence of flowing into the first pressure control chamber 1122. Then, the flow of the ink from the first valve chamber 1121 into the first pressure control chamber 1122 brings about a rise in pressure inside the first pressure control chamber, thereby increasing the inner volume of the first pressure control chamber and establishing the closed state of the communication port 1191A. In this way, the open state and the closed state are repeated in the communication port 1191A along with the ink consumption. In the meantime, the communication port 1191A is maintained in the closed state in the case where the ink is not consumed.

FIG. 20B schematically shows the flow of the ink immediately after the printing operation is completed and the circulation pump 1500 transitions to off state (a stopped state). At the point of completion of the printing operation and in the off state of the circulation pump 1500, both the pressure in the first pressure control chamber 1122 and the pressure in the second pressure control chamber 1152 are set to the control pressures in the course of the printing operation. For this reason, movement of the ink is generated as shown in FIG. 20B in accordance with the differential pressure between the pressure in the first pressure control chamber 1122 and the pressure in the second pressure control chamber 1152. To be more precise, the flow of the ink to be supplied from the first pressure control chamber 1122 to the ejection module 1300 through the supply flow passage 1130 and then to reach the second pressure control chamber 1152 through the collection flow passage 1140 is continuously generated. Meanwhile, the flow of the ink from the first pressure control chamber 1122 to the second pressure control chamber 1152 through the bypass flow passage 1160 and the second valve chamber 1151 is continuously generated as well.

Due to these flows of the ink, the ink in an amount equivalent to the amount of ink having moved from the first pressure control chamber 1122 to the second pressure control chamber 1152 is supplied from the ink tank 2 to the first pressure control chamber 1122 through the filter 1110 and the first valve chamber 1121. As a consequence, an internal content in the first pressure control chamber 1122 is kept constant. Based on the relation of the above-mentioned formula 2, the spring force F1 of the valve spring 1200, the spring force F2 of the pressure adjustment spring 1220, the pressure receiving area Si of the valve 1190, and the pressure receiving area S2 of the pressing plate 1210 are kept constant in the case where the internal content in the first pressure control chamber 1122 is constant. Accordingly, the pressure in the first pressure control chamber 1122 is determined in accordance with the change in pressure (gauge pressure) P1 in the first valve chamber 1121. Therefore, in the case where there is no change of the pressure P1 in the first valve chamber 1121, the pressure P2 in the first pressure control chamber 1122 is maintained at the same pressure as the control pressure during the printing operation.

On the other hand, the pressure in the second pressure control chamber 1152 varies over time in accordance with a change in internal content associated with the inflow of the ink from the first pressure control chamber 1122. To be more precise, during a period of transition from the state in FIG. 20B to a state where the state of non-communication between the second valve chamber 1151 and the second pressure control chamber 1152 takes place due to establishment of the closed state of the communication port 1191 as shown in FIG. 20C, the pressure in the second pressure control chamber 1152 varies in accordance with the formula 2. Thereafter, the pressing plate 1210 and the valve shaft 1190*a* transition to the state of non-contact whereby the closed state of the communication port 1191 is established. Then, the ink flows from the collection flow passage 1140 into the second pressure control chamber 1152 as shown in FIG. 20D. Due to this ink inflow, the pressing plate 1210 and the flexible member 1230 are displaced. Hence, the pressure in the second pressure control chamber 1152 varies, or more specifically, increases in accordance with the formula 4 until the internal content in the second pressure control chamber 1152 reaches a maximum.

Note that the flow of the ink from the first pressure control chamber 1122 to the second pressure control chamber 1152 through the bypass flow passage 1160 and the second valve chamber 1151 is not generated in the case where the state shown in FIG. 20C takes place. Accordingly, there is only generated the flow of the ink in the first pressure control chamber 1122 to be supplied to the ejection module 1300 through the supply flow passage 1130 and then to reach the second pressure control chamber 1152 through the collection flow passage 1140. As described above, the movement of the ink from the first pressure control chamber 1122 to the second pressure control chamber 1152 is generated in accordance with the differential pressure between the pressure in the first pressure control chamber 1122 and the pressure in the second pressure control chamber 1152. For this reason, the movement of the ink is stopped in the case where the pressure in the second pressure control chamber 1152 becomes equal to the pressure in the first pressure control chamber 1122.

Meanwhile, in the state where the pressure in the second pressure control chamber 1152 is equal to the pressure in the first pressure control chamber 1122, the second pressure control chamber 1152 expands to a state shown in FIG. 20D. In the case where the second pressure control chamber 1152 expands as shown in FIG. 20D, a reservoir unit capable of reserving the ink is formed in the second pressure control chamber 1152. Although it may vary depending on the shape and the size of the flow passage and on properties of the ink, the stopped state of the circulation pump 1500 transitions to the state shown in FIG. 20D within a period of about 1 to 2 minutes. In the case of driving the circulation pump 1500 in the state of reserving the ink in the reservoir unit as shown in FIG. 20D, the ink in the reservoir unit is supplied to the first pressure control chamber 1122 by using the circulation pump 1500. Thus, the amount of the ink in the first pressure control chamber 1122 is increased as shown in FIG. 20E, and the flexible member 1230 and the pressing plate 1210 are displaced in an expanding direction. Then, as the circulation pump 1500 is continuously driven, the state inside the circulation path will be changed as shown in FIG. 20A.

In the above description, FIG. 20A has been explained as the example in the case of the printing operation. However, as mentioned earlier, the ink may be circulated irrespective of execution of the printing operation. In this case as well, the flow of the ink is generated as shown in FIGS. 20A to 20E in accordance with the drive and the stop of the circulation pump 1500.

As described above, the present embodiment adopts the example in which a communication port 1191B in the second pressure adjustment unit 1150 is set to the open state in the case where the ink is circulated by driving the circulation pump 1500, and is set to the closed state in the case where the circulation of the ink is stopped. However, the present disclosure is not limited only to this configuration. The control pressure in the communication port 1191B in the second pressure adjustment unit 1150 may be set so as to establish the closed state even in the case where the ink is circulated by driving the circulation pump 1500. This configuration will be specifically described below together with a function of the bypass flow passage 1160.

The bypass flow passage 1160 to connect the first pressure adjustment unit 1120 to the second pressure adjustment unit 1150 is provided in order not to adversely affect the ejection module 1300 in a case where the negative pressure generated in the circulation path exceeds a predetermined value, for example. Moreover, the bypass flow passage 1160 is also provided in order to supply the ink from both the supply flow passage 1130 side and the collection flow passage 1140 side into a pressure chamber 1012.

The example of providing the bypass flow passage 1160 in order not to adversely affect the ejection module 1300 in the case where the negative pressure exceeds the predetermined value will be described to begin with. A property (such as viscosity) of the ink may be altered by a change in environmental temperature, for instance. In the case where the viscosity of the ink is altered, the pressure loss in the circulation path is changed as well. For example, the pressure loss in the circulation path is reduced in the case where the viscosity of the ink is decreased. As a consequence, a flow rate of the circulation pump 1500 being driven at a constant drive amount is increased and the volume of the flow in the ejection module 1300 is increased as a consequence. On the other hand, the ejection module 1300 is maintained at a constant temperature by using a not-illustrated temperature adjustment mechanism. Accordingly, the viscosity of the ink in the ejection module 1300 is kept constant even in the case of a change in environmental temperature. Since the flow rate of the ink flowing in the ejection module 1300 is increased while there is no change in viscosity of the ink in the ejection module 1300, the negative pressure in the ejection module 1300 is increased due to flow resistance. In the case where the negative pressure in the ejection module 1300 exceeds the predetermined value as escribed above, a meniscus on the ejection port 1013 may be destroyed and normal ejection may therefore be infeasible. Even in a case where the meniscus is spared from destruction, the negative pressure in the pressure chamber 1012 exceeds a prescribed value and ejection therefrom may be adversely affected.

Given the circumstances, the bypass flow passage 1160 is formed inside the circulation path in the present embodiment. By providing the bypass flow passage 1160, the ink also flows in the bypass flow passage 1160 in the case where the negative pressure exceeds the predetermined value. Thus, the pressure in the ejection module 1300 can be kept constant. Accordingly, the communication port 1191B in the second pressure adjustment unit 1150 may be provided with such a control pressure that maintains the closed state even in the case where the circulation pump 1500 is being driven. Moreover, the control pressure in the second pressure adjustment unit 1150 may be set such that the communication port 1191 in the second pressure adjustment unit 1150 establishes the open state in the case where the negative pressure exceeds the predetermined value. In other words, the communication port 1191B may be in the closed state in the case of driving the circulation pump 1500 as long as the meniscus is not destroyed by the change in flow rate in the pump due to the change in viscosity such as an environmental change, or as long as the predetermined negative pressure is maintained.

Configuration of Ejection Unit

Figure 21A:
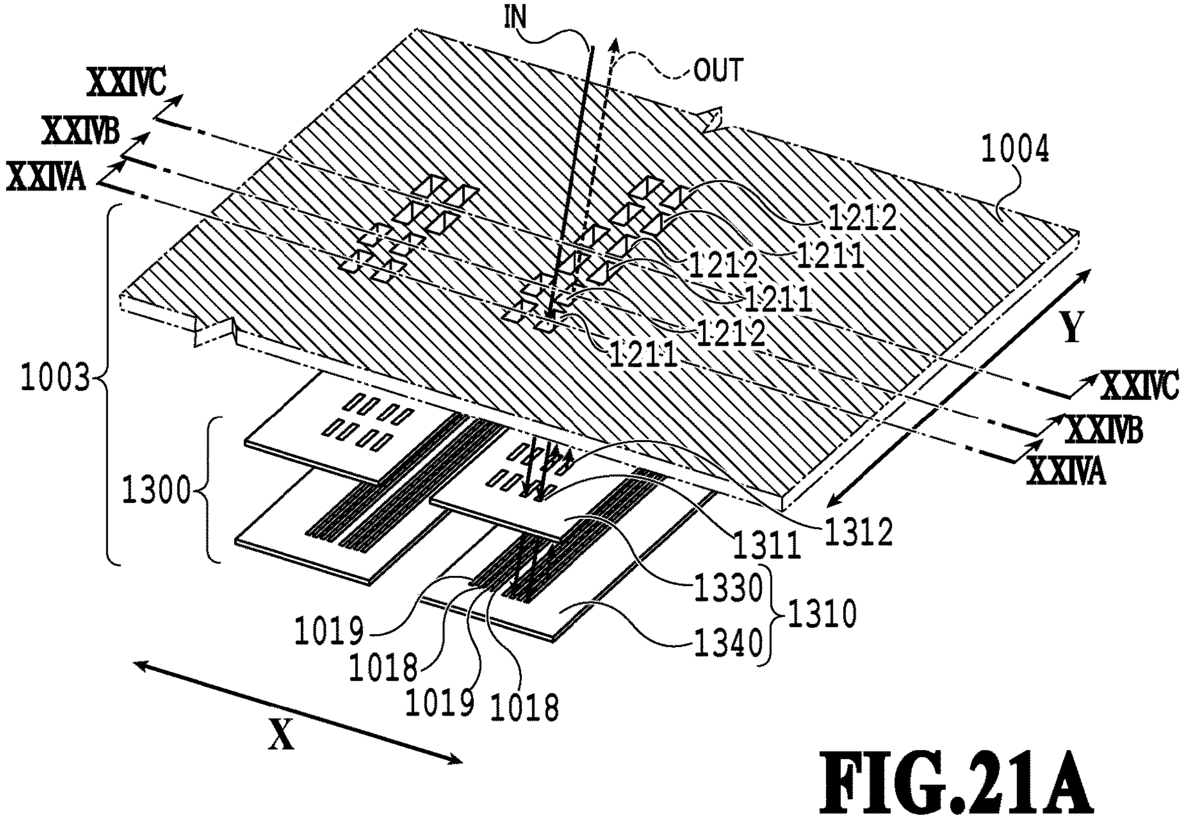
FIG. 21A is a schematic diagram showing a circulation path for one ink color in an ejection unit.
Figure 21B:
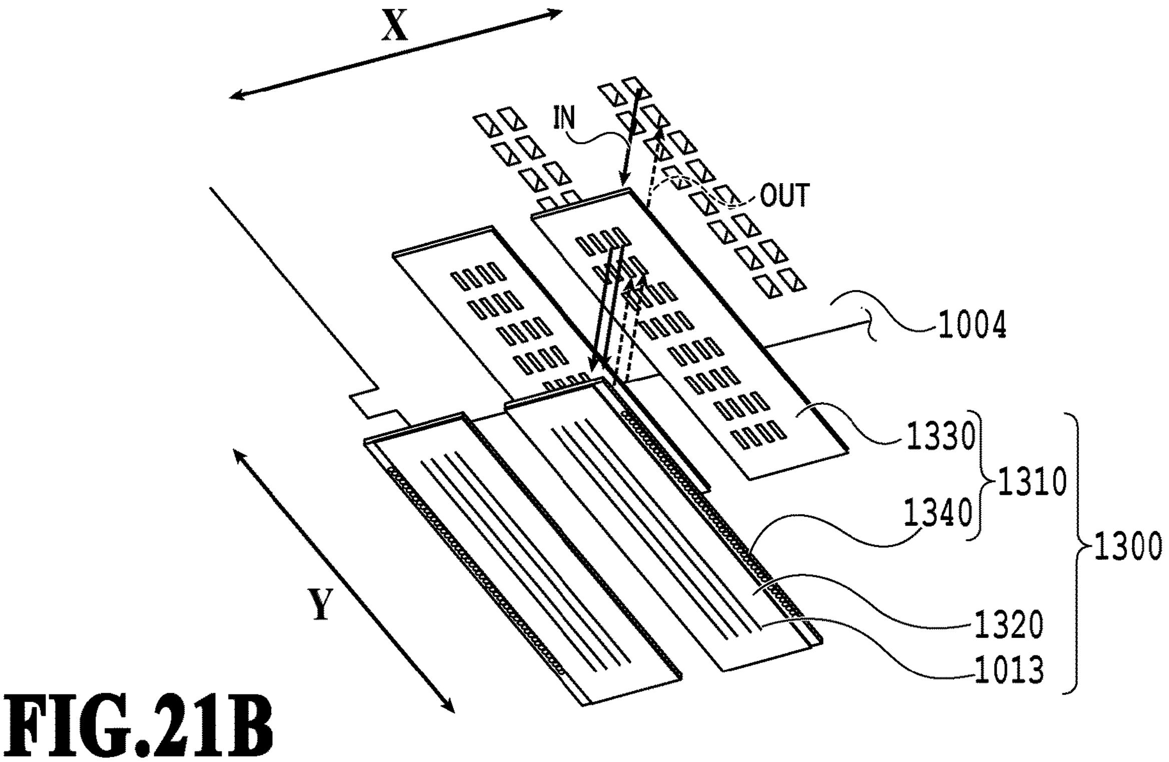
FIG. 21B is another schematic diagram showing the circulation path for one ink color in the ejection unit.
Figure 22:
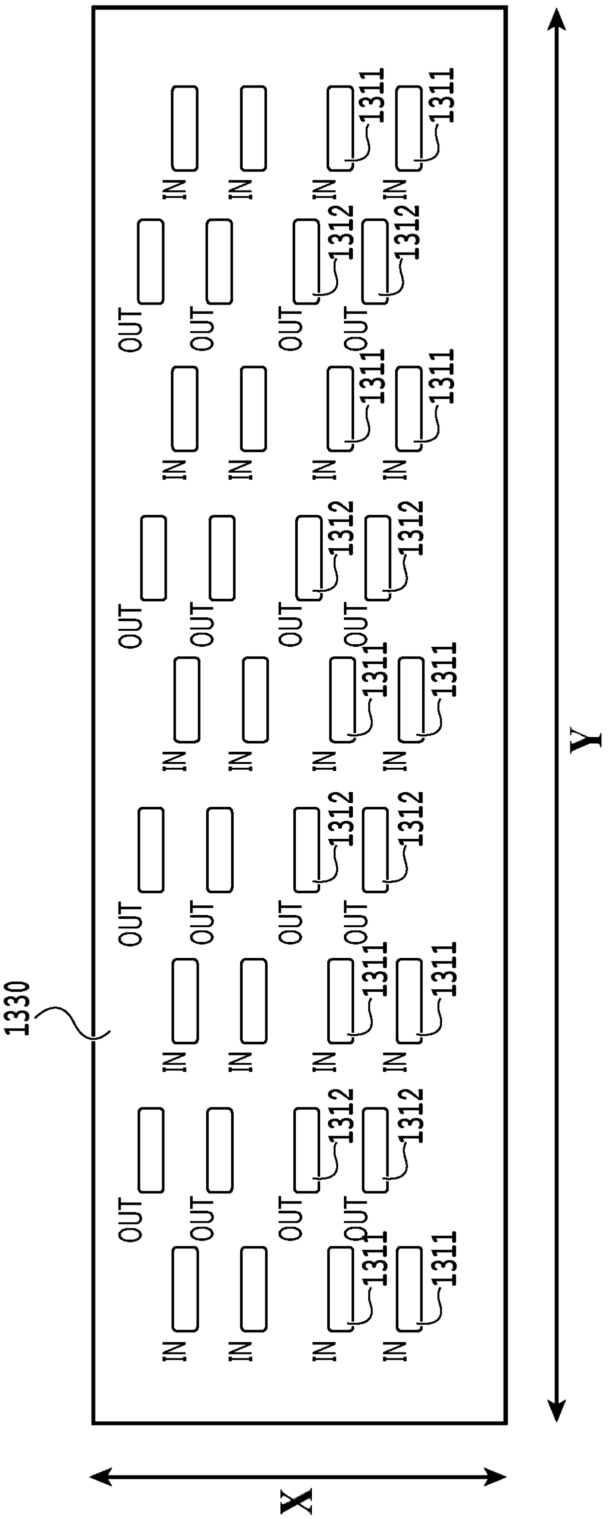
FIG. 22 is a diagram showing an opening plate.
Figure 23:
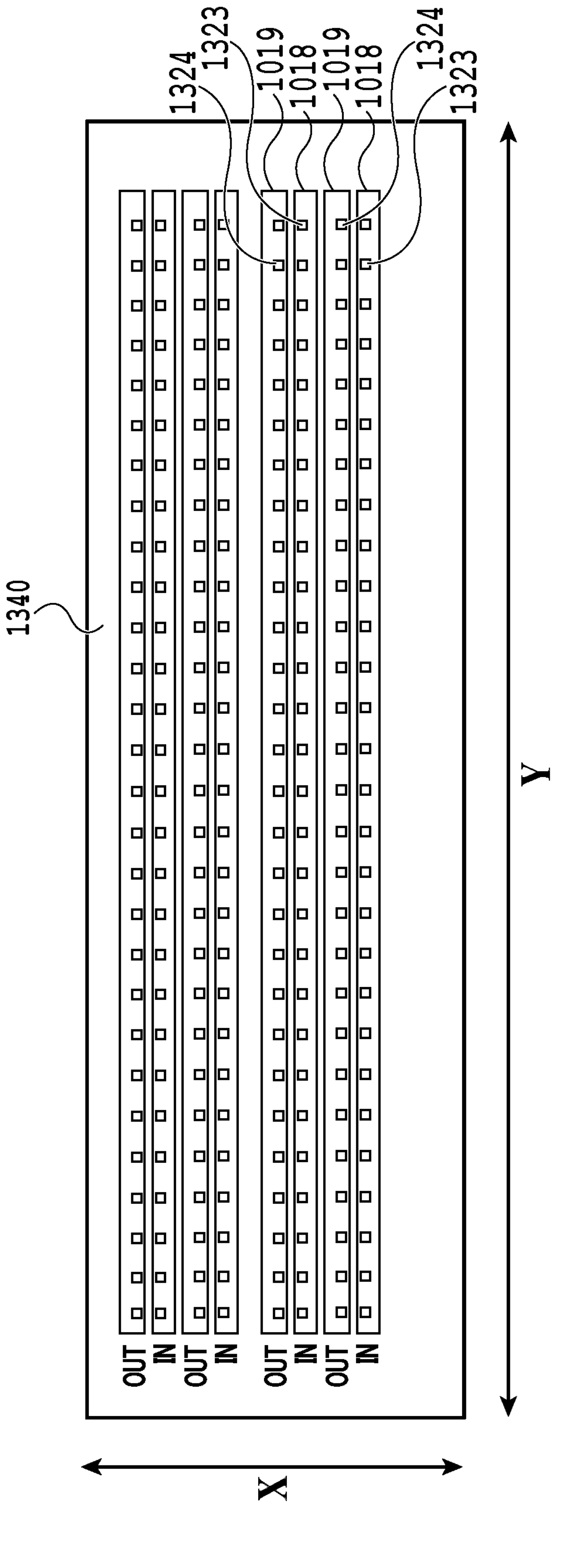
FIG. 23 is a diagram showing an ejection element board.

FIGS. 21A and 21B are schematic diagrams showing a circulation path for one ink color in an ejection unit 1003 of the present embodiment. FIG. 21A is an exploded perspective view of the ejection unit 1003 viewed from a first support member 1004 side, and FIG. 21B is an exploded perspective view of the ejection unit 1003 viewed from the ejection module 1300 side. Note that each of arrows with IN and OUT remarks indicated in the FIGS. 21A and 21B shows a flow of the ink. Although the flows of the ink for one color will be discussed herein, inks of other colors exhibit similar flows. Meanwhile, illustration of a second support member and electric wiring members is omitted in FIGS. 21A and 21B. Explanations of these constituents are also omitted in the following description of the configuration of the ejection unit. The ejection module 1300 includes an ejection element board 1340 and an opening plate 1330. FIG. 22 is a diagram showing the opening plate 1330, and FIG. 23 is a diagram showing the ejection element board 1340.

The ink is supplied from the circulation unit 200 to the ejection unit 1003 through a not-illustrated joint member. A description will be given of the ink path from a point after the ink passes through the joint member to a point of return of the ink to the joint member.

The ejection module 1300 includes the ejection element board 1340, which is a silicon substrate 1310, and the opening plate 1330. The ejection module 1300 also includes an ejection port forming member 1320. The ejection element board 1340, the opening plate 1330, and the ejection port forming member 1320 are stacked on and bonded to one another in such a way as to establish communication of the flow passages for the respective inks, thus constituting the ejection module 1300 that is supported by the first support member 1004. The ejection unit 1003 is formed by supporting the ejection module 1300 by the first support member 1004. The ejection element board 1340 includes the ejection port forming member 1320. The ejection port forming member 1320 includes ejection port rows each formed from the ejection ports 1013 arranged in a row. Part of the ink supplied through ink flow passages in the ejection module 1300 is ejected from each ejection port 1013. The ink which is not ejected is recovered through the ink flow passages in the ejection module 1300.

As shown in FIGS. 21A, 21B, and 22, the opening plate 1330 includes arranged ink supply ports 1311 and arranged ink collection ports 1312. As shown in FIGS. 23 and 24A to 24C, the ejection element board 1340 includes arranged supply connection flow passages 1323 and arranged collection connection flow passages 1324. In addition, the ejection element board 1340 includes common supply flow passages 1018 that communicate with the supply connection flow passages 1323, and common collection flow passages 1019 that communicate with the collection connection flow passages 1324. The ink flow passages in the ejection unit 1003 are formed by causing ink supply flow passages 1048 and ink collection flow passages 1049, which are provided to the first support member 1004, to communicate with the flow passages that are provided to the ejection module 1300. Support member supply ports 1211 are cross-sectional openings that constitute the ink supply flow passages 1048 and support member collection ports 1212 are cross-sectional openings that constitute the ink collection flow passages 1049.

The ink to be supplied to the ejection unit 1003 is supplied from the circulation unit 200 side to the ink supply flow passages 1048 of the first support member 1004. The ink flowing through the support member supply ports 1211 in the ink supply flow passages 1048 is supplied to the common supply flow passages 1018 of the ejection element board 1340 through the ink supply flow passages 1048 and the ink supply ports 1311 of the opening plate 1330, and then enters the supply connection flow passages 1323. These flow passages collectively constitute supply side flow passages. Thereafter, the ink flows to the collection connection flow passages 1324 of collection side flow passages through the pressure chambers 1012 of the ejection port forming member 1320. Details of the flow of the ink in each pressure chamber 1012 will be described later.

In the collection side flow passages, the ink entering the collection connection flow passages 1324 flows in the common collection flow passages 1019. Thereafter, the ink flows from the common collection flow passages 1019 to the ink collection flow passages 1049 of the first support member 1004 through the ink collection ports 1312 of the opening plate 1330, and is recovered by the circulation unit 200.

A region in the opening plate 1330 not provided with the ink supply ports 1311 or the ink collection ports 1312 corresponds to a region for partitioning the support member supply ports 1211 and the support member collection ports 1212 in the first support member 1004. Moreover, no openings are provided to the first support member 1004 in this region. The above-mentioned region is used as an attachment region in a case of attaching the ejection module 1300 to the first support member 1004.

In the opening plate 1330 in FIG. 22, rows of openings arranged in the x direction are provided in the y direction. Here, supply (IN) openings and collection (OUT) openings are alternately arranged in the y direction in such a way as to be displaced by a half pitch in the x direction. In the ejection element board 1340 in FIG. 23, the common supply flow passages 1018 communicating with the supply connection flow passages 1323 arranged in the y direction and the common collection flow passages 1019 communicating with the collection connection flow passages 1324 arranged in the y direction are alternately arranged in the x direction. The common supply flow passages 1018 and the common collection flow passages 1019 are separated by the types of the inks. Moreover, the numbers of the common supply flow passages 1018 and the common collection flow passages 1019 disposed are determined in accordance with the numbers of ejection port rows of the respective colors. In the meantime, the supply connection flow passages 1323 and the collection connection flow passages 1324 are also arranged in the numbers corresponding to the ejection ports 1013. Here, the supply connection flow passages 1323 and the collection connection flow passages 1324 do not always have to correspond one-to-one to the ejection ports 1013. One supply connection flow passage 1323 and one collection connection flow passage 1324 may deal with two or more ejection ports 1013.

The opening plate 1330 and the ejection element board 1340 described above are stacked on and bonded to each other such that the flow passages for the respective inks establish communication, thus being formed into the ejection module 1300 which is supported by the first support member 1004. In this way, the ink flow passages are formed which include the supply flow passages and the collection flow passages as described above.

Figure 24A:
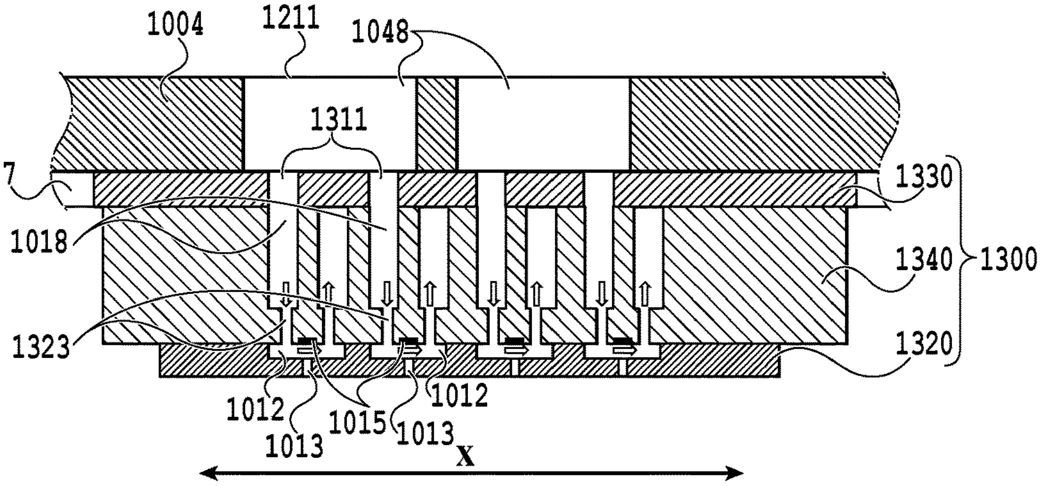
FIG. 24A is a cross-sectional view showing a flow of an ink at a certain portion of the ejection unit.
Figure 24B:
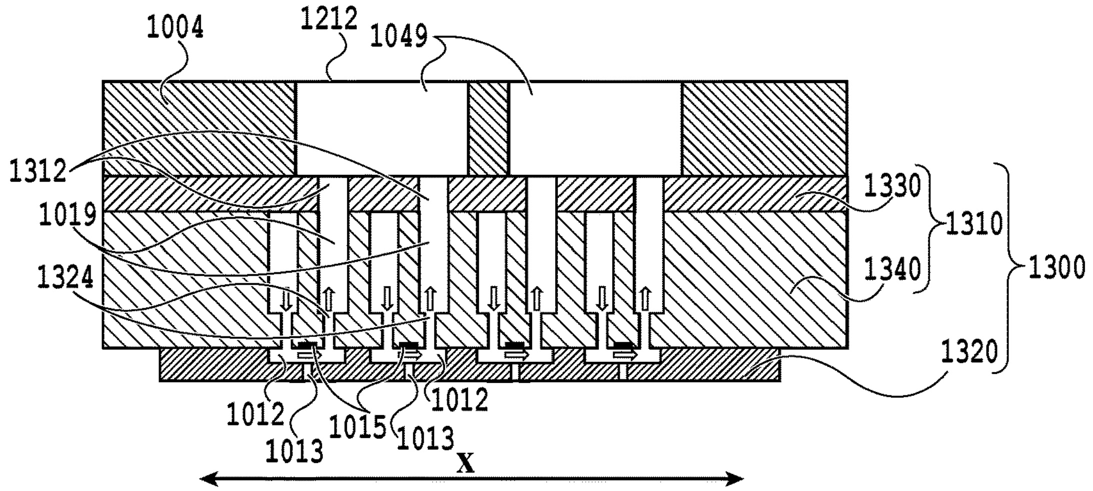
FIG. 24B is a cross-sectional view showing the flow of the ink at a different portion of the ejection unit.
Figure 24C:
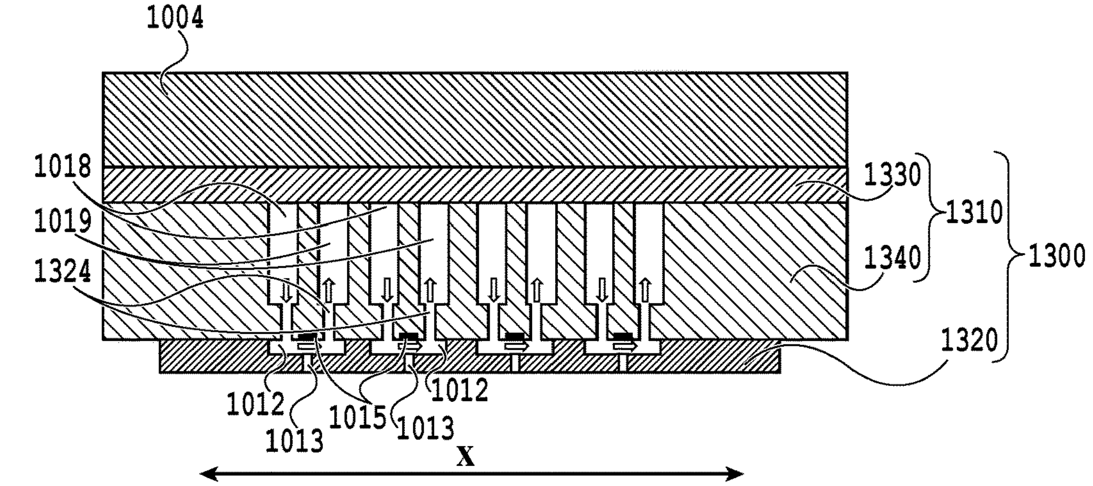
FIG. 24C is a cross-sectional view showing the flow of the ink at another different portion of the ejection unit.

FIGS. 24A to 24C are cross-sectional views showing the flow of the ink at different portions of the ejection unit 1003. FIG. 24A shows a cross-sectional view taken along the XXIVA-XXIVA line in FIG. 21A, which represents a cross-section of a portion where the ink supply flow passages 1048 communicate with the ink supply ports 1311 in the ejection unit 1003. Meanwhile, FIG. 24B shows a cross-sectional view taken along the XXIVB-XXIVB line in FIG. 21A, which represents a cross-section of a portion where the ink collection flow passages 1049 communicate with the ink collection ports 1312 in the ejection unit 1003. In the meantime, FIG. 24C shows a cross-sectional view taken along the XXIVC-XXIVC line in FIG. 21A, which represents a cross-section of a portion where the ink supply ports 1311 or the ink collection ports 1312 do not communicate with the flow passages of the first support member 1004.

In the supply flow passages to supply the ink, the ink is supplied from portions where the ink supply flow passages 1048 of the first support member 1004 overlap and communicate with the ink supply ports 1311 of the opening plate 1330 as shown in FIG. 24A. Meanwhile, in the collection flow passages to recover the ink, the ink is recovered from portions where the ink collection flow passages 1049 of the first support member 1004 overlap and communicate with the ink collection ports 1312 of the opening plate 1330 as shown in FIG. 24B. In the meantime, there are also regions in the ejection unit 1003 where openings are not partially provided to the opening plate 1330. In such a region, the ink is not supplied or recovered between the ejection element board 1340 and the first support member 1004. The ink is supplied in the regions where the ink supply ports 1311 are provided as shown in FIG. 24A, and the ink is recovered in the regions where the ink collection ports 1312 are provided as shown in FIG. 24B. Although the present embodiment has described an example of the configuration adopting the opening plate 1330, a mode of not using the opening plate 1330 is also acceptable. For instance, a configuration to provide the first support member 1004 with the flow passages corresponding to the ink supply flow passages 1048 and the ink collection flow passages 1049, and to bond the ejection element board 1340 to the first support member 1004 is also acceptable.

Figure 25A:
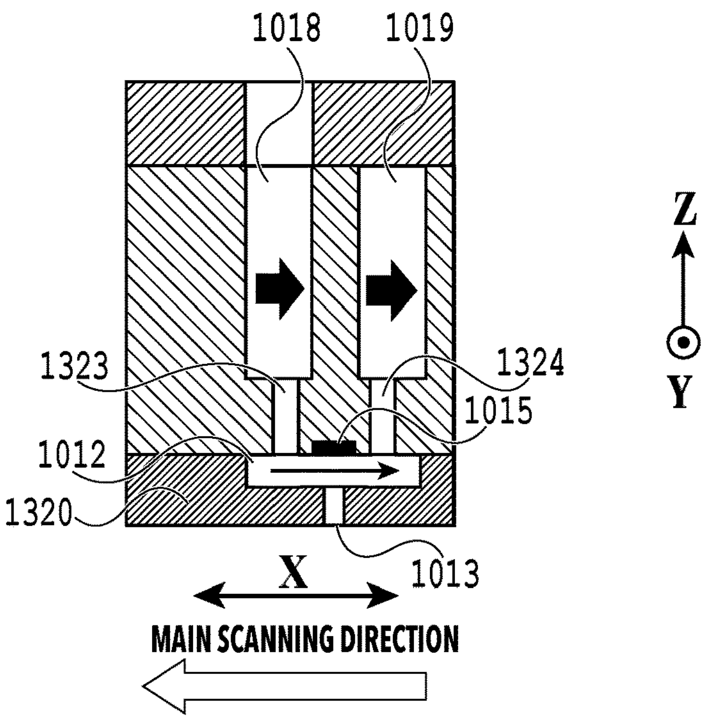
FIG. 25A is a cross-sectional view showing a portion in the vicinity of an ejection port in an ejection module.
Figure 25B:
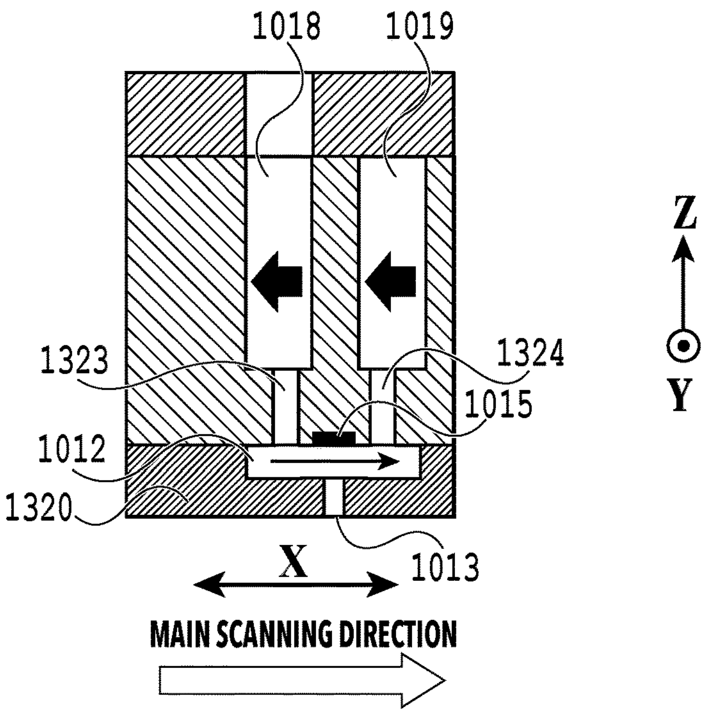
FIG. 25B is another cross-sectional view showing the portion in the vicinity of the ejection port in the ejection module.

FIGS. 25A and 25B are cross-sectional views showing a portion in the vicinity of a certain ejection port 1013 in the ejection module 1300. Note that thick arrows indicated in a common supply flow passage 1018 and a common collection flow passage 1019 in FIGS. 25A and 25B represent swing of the ink in a mode of using the serial type liquid ejection apparatus 2000. The ink supplied to the pressure chamber 1012 through the common supply flow passage 1018 and the supply connection flow passage 1323 is ejected from the ejection port 1013 by driving an ejection element 1015. In the case where the ejection element 1015 is not driven, the ink passes through the pressure chamber 1012 and the collection connection flow passage 1324 being the collection flow passage, and is recovered by the common collection flow passage 1019.

In the case of ejecting the circulating ink in the mode of using the serial type liquid ejection apparatus 2000 as described above, the ejection of the ink is affected more than a little by the swing of the ink in the ink flow passage, which is attributed to main scanning of the liquid ejection head 1000. To be more precise, an impact of the swing of the ink in the ink flow passage manifests as a difference in amount of ejection of the ink or as deviation in direction of ejection.

Given the circumstances, the common supply flow passage 1018 and the common collection flow passage 1019 of the present embodiment is configured to extend in the y direction in the cross-sections shown in FIGS. 25A and 25B, and also to extend in the z direction that is perpendicular to the x direction being the main scanning direction. This configuration can reduce the width in the main scanning direction of each of the common supply flow passage 1018 and the common collection flow passage 1019. The swing of the ink attributable to a force of inertial (black thick arrows in FIGS. 25A and 25B to be applied in an opposite direction from the scanning direction, which acts on the ink in the common supply flow passage 1018 and the common collection flow passage 1019 in the course of main scanning, is diminished by reducing the width in the main scanning direction of each of the common supply flow passage 1018 and the common collection flow passage 1019. In this way, it is possible to suppress an adverse effect of the swing of the ink on the ink ejection. Moreover, each of the common supply flow passage 1018 and the common collection flow passage 1019 extends in the z direction in order to increase the cross-sectional area, thereby reducing pressure drops in the flow passages.

As described above, the common supply flow passage 1018 and the common collection flow passage 1019 are configured to reduce the swing of the ink therein by setting the small widths of the common supply flow passage 1018 and the common collection flow passage 1019 in the main scanning direction. Nevertheless, this configuration cannot completely eliminate the swing. Therefore, the present embodiment is configured to deploy the common supply flow passages 1018 and the common collection flow passages 1019 at positions overlapping one another in the x direction so as to suppress the occurrence of a difference in ejection among the inks of the different types that may develop even by the reduced amount of swing.

As described above, in the present embodiment, the supply connection flow passages 1323 and the collection connection flow passages 1324 are provided corresponding to the ejection ports 1013. Moreover, the supply connection flow passages 1323 and the collection connection flow passages 1324 have such a correspondence relation to be juxtaposed in the x direction while interposing the ejection ports 1013 in between. Accordingly, there are portions where the common supply flow passages 1018 do not overlap the common collection flow passages 1019 in the x direction. In a case where the correspondence relation in the x direction between the supply connection flow passages 1323 and the collection connection flow passages 1324 breaks up, the flow and ejection of the ink in the x direction in the pressure chambers 1012 may be adversely affected. Here, addition of the adverse effect of the swing of the ink may have a larger impact on ejection of the ink from each ejection port.

For this reason, the common supply flow passages 1018 are disposed at such positions overlapping the common collection flow passages 1019 in the x direction. In this way, the swing of the ink in the common supply flow passage 1018 at the time of the main scanning is substantially equal to the swing of the ink in the corresponding common collection flow passage 1019 at any position in the y direction in which the ejection ports 1013 are arranged. As a consequence, it is possible to achieve stable ejection while avoiding a significant variation in pressure difference between the common supply flow passage 1018 side and the common collection flow passage 1019 side, which may take place in each pressure chamber 1012.

Meanwhile, some liquid ejection heads that circulate the ink may be configured to use the same flow passage for forming the flow passage to supply the ink to the liquid ejection head and the flow passage to recover the ink therefrom. On the other hand, according to the present embodiment, the common supply flow passage 1018 and the common collection flow passage 1019 are provided as separate flow passages. Moreover, each pressure chamber 1012 communicates with the supply connection flow passage 1323 and the pressure chamber 1012 also communicates with the collection connection flow passage 1324. Hence, the ink is ejected from the ejection port 1013 of the pressure chamber 1012. In other words, the pressure chamber 1012 serving as the path to join the supply connection flow passage 1323 to the collection connection flow passage 1324 is also provided with the ejection port 1013. Accordingly, the flow of the ink that flows from the supply connection flow passage 1323 side to the collection connection flow passage 1324 side is generated in the pressure chamber 1012, and the ink in the pressure chamber 1012 is efficiently circulated. The efficient circulation of the ink in the pressure chamber 1012 can keep the ink in the pressure chamber 1012 in a fresh condition although this ink is susceptible to evaporation from the ejection port 1013.

In the meantime, the two flow passages of the common supply flow passage 1018 and the common collection flow passage 1019 communicate with the corresponding pressure chamber 1012. Accordingly, it is also possible to supply the ink from both of the flow passages in the case where ejection has to be carried out at a high flow rate. In other words, as compared to the configuration to supply and recover the ink with only one flow passage, the configuration of the present embodiment has an advantage that it is possible not only to perform the circulation efficiently but also to deal with ejection at a high flow rate.

Meanwhile, the adverse effect of the swing of the ink becomes even less in the case where the common supply flow passage 1018 and the common collection flow passage 1019 are located at positions close to each other in the x direction. Such an interval between the flow passages may desirably be set in a range from 75 to 100 μm.

Figure 26:
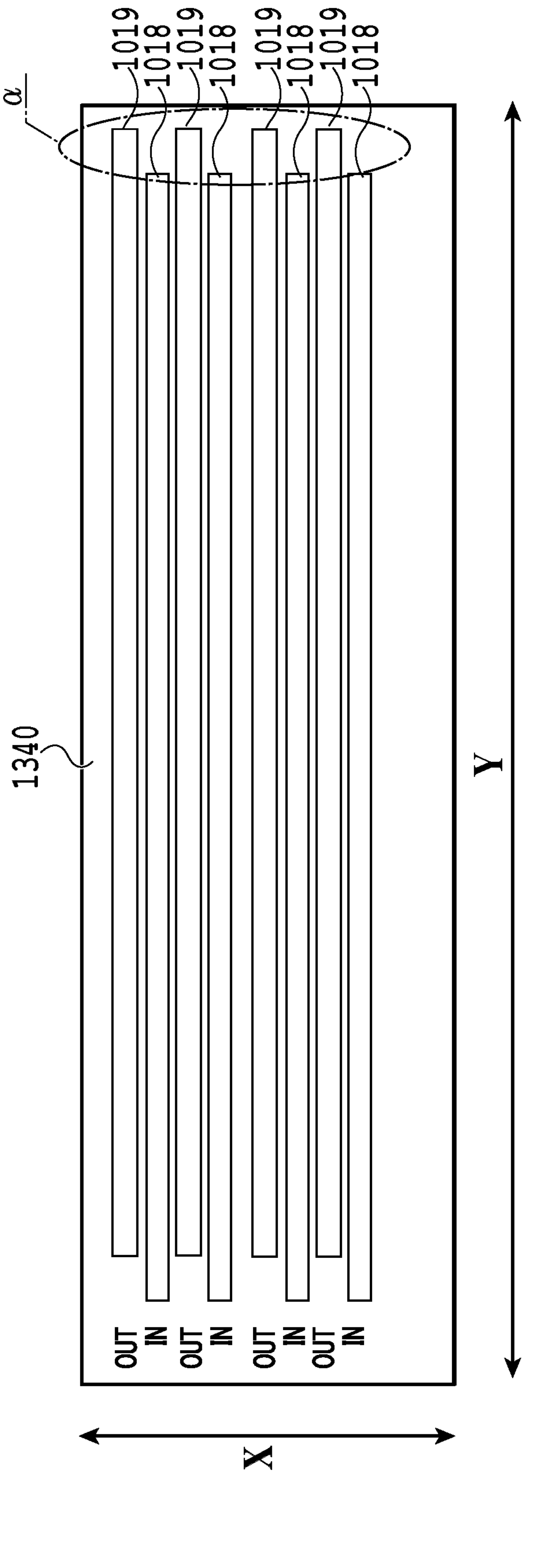
FIG. 26 is a diagram showing an ejection element board of a comparative example.

FIG. 26 is a diagram showing an ejection element board 1340 of a comparative example. Note that illustration of the supply connection flow passages 1323 and the collection connection flow passages 1324 is omitted in FIG. 26. The ink that receives thermal energy from the ejection element 1015 in the pressure chamber 1012 flows into the common collection flow passage 1019. Accordingly, the ink flowing therein has a relatively higher temperature than a temperature of the ink in the common supply flow passage 1018. In this instance, in the comparative example, there is a portion in the x direction of the ejection element board 1340, such as a portion a surrounded by a chain line in FIG. 26, which is a portion where only the common collection flow passages 1019 are present. In this case, the temperature is locally increased in the relevant portion. Accordingly, a temperature variation may occur in the ejection module 1300 and may adversely affect the ejection.

The ink flowing in the common supply flow passage 1018 has a relatively low temperature as compared to that in the common collection flow passage 1019. For this reason, in the case where the common supply flow passage 1018 and the common collection flow passage 1019 are located adjacent to each other, a certain degree of the temperatures in the common supply flow passage 1018 and in the common collection flow passage 1019 are cancelled and a rise in temperature is therefore suppressed. Accordingly, the common supply flow passage 1018 and the common collection flow passage 1019 having substantially the same lengths are preferably present at positions overlapping each other in the x direction and adjacent to each other.

Figure 27A:
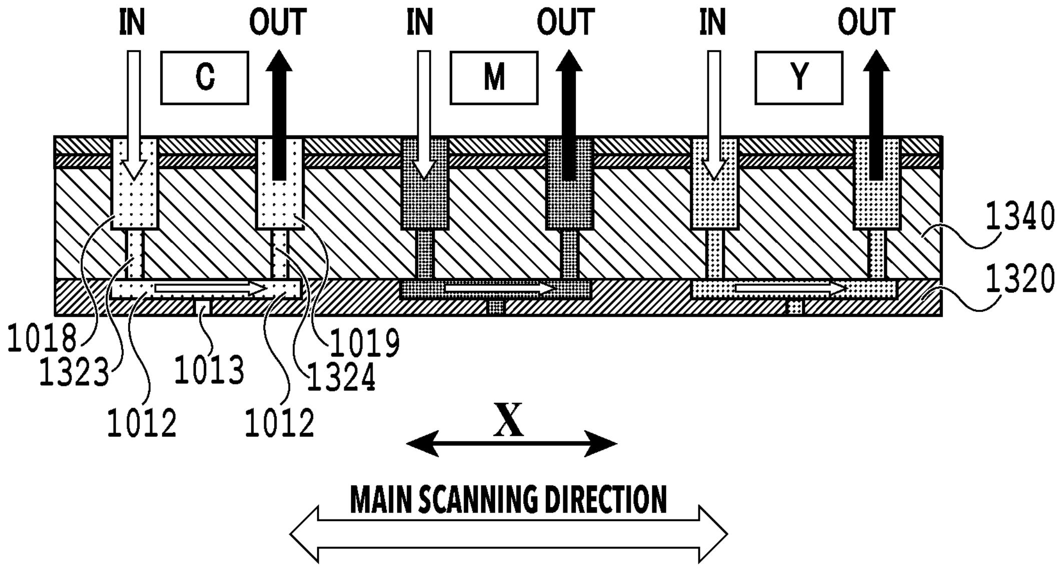
FIG. 27A is a diagram showing a flow passage configuration of a liquid ejection head adaptable to inks of three colors.
Figure 27B:
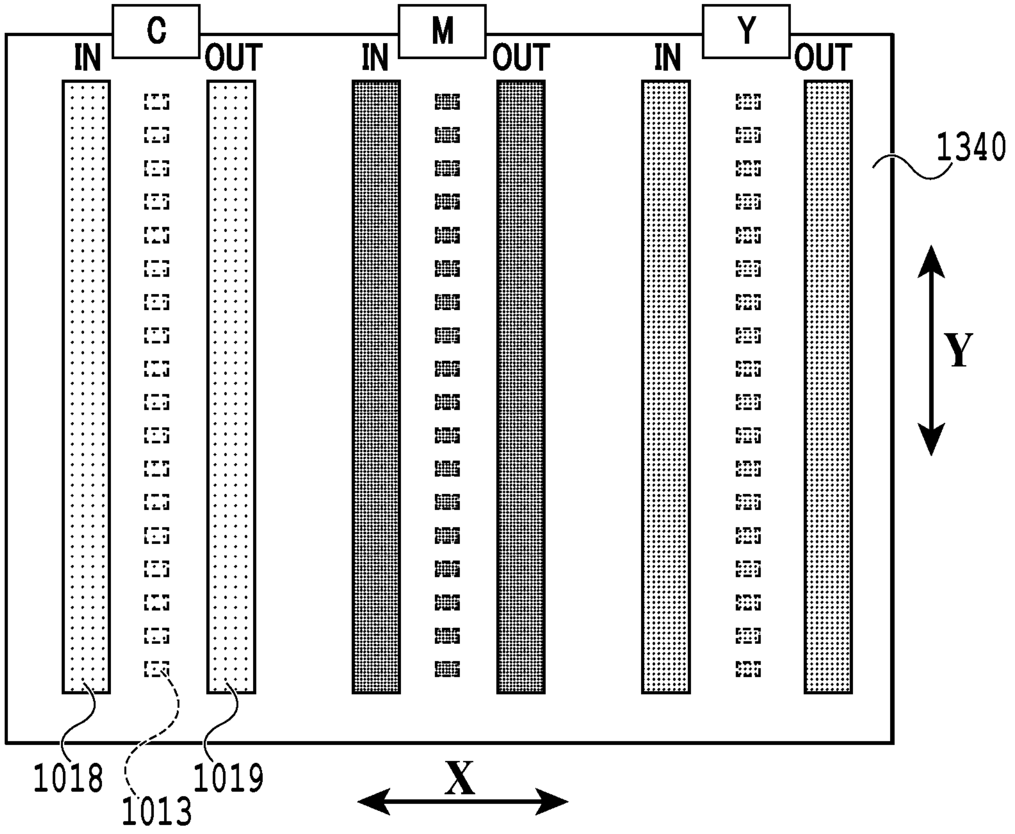
FIG. 27B is another diagram showing the flow passage configuration of the liquid ejection head adaptable to inks of three colors.

FIGS. 27A and 27B are diagrams showing a flow passage configuration of the liquid ejection head 1000 adaptable to inks of three colors of cyan (C), magenta (M), and yellow (Y). As shown in FIG. 27A, the liquid ejection head 1000 is provided with circulation flow passages for the respective ink types. The pressure chambers 1012 are provided in the x direction being the main scanning direction of the liquid ejection head 1000. Meanwhile, as shown in FIG. 27B, the common supply flow passage 1018 and the common collection flow passage 1019 are provided along the ejection port row on which the ejection port 1013 are arranged, the common supply flow passage 1018 and the common collection flow passage 1019 are provided extending in the y direction in such a way as to interpose the ejection port row in between.

Connection Between Body Unit and Liquid Ejection Head

Figure 28:
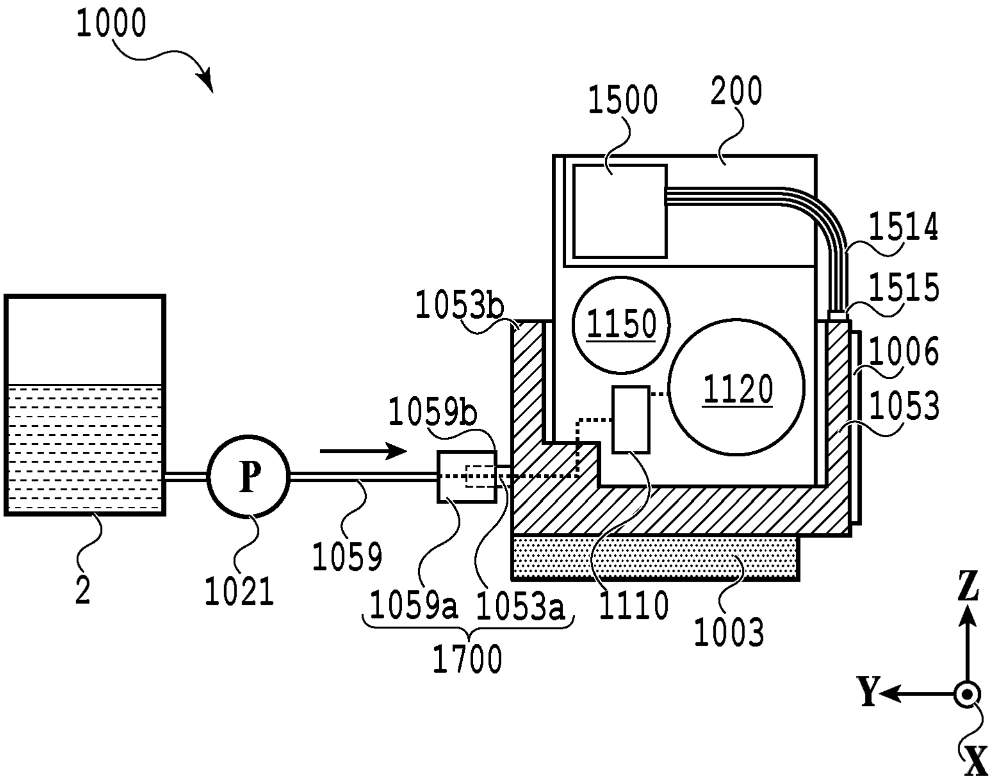
FIG. 28 is a diagram showing a state of connection of the liquid ejection head to an ink tank and an external pump.

FIG. 28 is a schematic configuration diagram showing details of a state of connection of the liquid ejection head 1000 to the ink tank 2 and the external pump 1021 provided to a body unit of the liquid ejection apparatus 2000, and a layout of the circulation pump and the like. The liquid ejection apparatus 2000 according to the present embodiment has such a configuration that facilitates replacement of the liquid ejection head 1000 only in a case of the occurrence of a failure in the liquid ejection head 1000. To be more precise, there is provided a liquid connection unit 1700 that facilitates connection and detachment of the liquid ejection head 1000 to and from an ink supply tube 1059 that is connected to the external pump 1021. This makes it possible to attach and detach only the liquid ejection head 1000 to and from the liquid ejection apparatus 2000 easily.

As shown in FIG. 28, the liquid connection unit 1700 includes a liquid connector insertion slot 1053*a* provided in a projecting manner to a head housing 1053 of the liquid ejection head 1000, and a cylindrical liquid connector 1059*a* which can be inserted into this liquid connector insertion slot 1053*a*. The liquid connector insertion slot 1053*a* is fluidically connected to the ink supply flow passage formed inside the liquid ejection head 1000, and is connected to the first pressure adjustment unit 1120 through the filter 1110 mentioned above. Meanwhile, the liquid connector 1059*a* is provided at a tip of the ink supply tube 1059 connected to the external pump 1021 that pressure-supplies the ink from the ink tank 2 to the liquid ejection head 1000.

As described above, the liquid ejection head 1000 shown in FIG. 28 facilitates attachment and detachment operations as well as a replacement operation of the liquid ejection head 1000 by using the liquid connection unit 1700. However, the ink that is pressure-supplied by the external pump 1021 may leak out of the liquid connection unit 1700 in case of deterioration of a sealing performance between the liquid connector insertion slot 1053*a* and the liquid connector 1059*a*. In case the leaking ink adheres to the circulation pump 1500 and the like, a failure may occur in an electric system and the like. Given the circumstances, the circulation pump and the like are laid out as described below in the present embodiment.

Layout of Circulation Pump and Others

As shown in FIG. 28, in the present embodiment, the circulation pump 1500 is disposed above the liquid connection unit 1700 in the gravitational direction in order to avoid adhesion of the ink to the circulation pump 1500 after leaking out of the liquid connection unit 1700. Specifically, the circulation pump 1500 is disposed above the liquid connector insertion slot 1053*a* in the gravitational direction, the liquid connector insertion slot 1053*a* serving as the liquid inlet port of the liquid ejection head 1000. Moreover, the circulation pump 1500 is located at a position so as not to come into contact with the components constituting the liquid connection unit 1700. Accordingly, even in case the ink leaks out of the liquid connection unit 1700, the ink will flow either in a horizontal direction being an opening direction of the liquid connector 1059*a* or downward in the gravitational direction. Thus, the ink can be kept from reaching the circulation pump 1500 located above in the gravitational direction. Moreover, since the circulation pump 1500 is located at the position distant from the liquid connection unit 1700, it is unlikely that the ink reaches the circulation pump 1500 while flowing on other members.

Meanwhile, an electric connection module 1515 for electrically connecting the circulation pump 1500 to an electric contact board 1006 through a flexible wiring member 1514 is provided above the liquid connection unit 1700 in the gravitational direction. This configuration can also reduce the chance of occurrence of electrical trouble due to the ink leaking out of the liquid connection unit 1700.

In the meantime, the head housing 1053 is provided with a wall portion 1053*b*. Accordingly, even in a case where the ink spouts from an opening 1059*b* of the liquid connection unit 1700, it is possible to block the ink and to reduce the chance that the ink reaches the circulation pump 1500 or the electric connection module 1515.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-081590 filed May 18, 2022, which is hereby incorporated by reference wherein in its entirety.

What is claimed is:

1. A liquid ejection apparatus comprising:
- a printing element board including a pressure chamber provided with an ejection port, wherein the printing element board is configured to eject a liquid from the ejection port;
- a supply flow passage provided to the printing element board and communicating with the pressure chamber;
- a collection flow passage provided to the printing element board and communicating with the pressure chamber; and
- a liquid feeding mechanism configured to generate a difference in pressure between the supply flow passage and the collection flow passage in such a way as to supply the liquid from the supply flow passage to the pressure chamber and to recover the liquid in the pressure chamber from the collection flow passage, and comprising
- a first bubble reservoir portion connecting the supply flow passage to the liquid feeding mechanism and
- a second bubble reservoir portion connecting the collection flow passage to the liquid feeding mechanism;
- wherein a volume of the first bubble reservoir portion is larger than a volume of the second bubble reservoir portion,
- wherein the first bubble reservoir portion includes a first pressure adjustment chamber capable of adjusting a pressure between the supply flow passage and the liquid feeding mechanism, and
- wherein the second bubble reservoir portion includes a second pressure adjustment chamber capable of adjusting a pressure between the collection flow passage and the liquid feeding mechanism.

2. The liquid ejection apparatus according to claim 1, wherein the printing element board, the supply flow passage, the collection flow passage, and the liquid feeding mechanism are provided to a liquid ejection head which is mounted on a carriage and is movable.

3. The liquid ejection apparatus according to claim 1,
- wherein the first bubble reservoir unit includes a supply connection flow passage formed in a flow passage member to be stacked on the printing element board, and
- wherein the second bubble reservoir unit includes a collection connection flow passage formed in the flow passage member.

4. The liquid ejection apparatus according to claim 1, wherein the first pressure adjustment chamber and the second pressure adjustment chamber are provided to a circulation unit connected to a flow passage member stacked on the printing element board.

5. The liquid ejection apparatus according to claim 1, wherein a volume of the first pressure adjustment chamber is larger than a volume of the second pressure adjustment chamber.

6. The liquid ejection apparatus according to claim 1, wherein the first pressure adjustment chamber is connected to the second pressure adjustment chamber through the liquid feeding mechanism, and wherein a bypass flow passage configured to connect the first pressure adjustment chamber to the second pressure adjustment chamber without interposing the liquid feeding mechanism is provided between the first pressure adjustment chamber and the second pressure adjustment chamber.

7. The liquid ejection apparatus according to claim 1, wherein the first pressure adjustment chamber is connected to a liquid tank through a filter.

8. The liquid ejection apparatus according to claim 1, wherein the first bubble reservoir unit and the second bubble reservoir unit are each provided with a slit having a shape of a groove along a flow of the liquid flowing in the first bubble reservoir unit and the second bubble reservoir unit.

9. The liquid ejection apparatus according to claim 8, wherein a width of the slit is in a range from 0.2 to 0.5 mm.

10. The liquid ejection apparatus according to claim 1, wherein a flow passage to join the supply flow passage to the first pressure adjustment chamber extends in a vertical direction.

11. The liquid ejection apparatus according to claim 10, wherein a flow passage to join the supply flow passage to the first pressure adjustment chamber is inclined relative to a gravitational direction, and wherein the flow passage includes a flow passage inner wall where a component force of a normal vector has a component in the gravitational direction.

12. The liquid ejection apparatus according to claim 10, wherein the volume of the first bubble reservoir unit is at least 1.2 times as large as the volume of the second bubble reservoir unit.

13. A liquid ejection head comprising:

a printing element board including a pressure chamber provided with an ejection port, wherein the printing element board is configured to eject a liquid from the ejection port;

a supply flow passage provided to the printing element board and communicating with the pressure chamber;

a collection flow passage provided to the printing element board and communicating with the pressure chamber; and a liquid feeding mechanism configured to generate a difference in pressure between the supply flow passage and the collection flow passage in such a way as to supply the liquid from the supply flow passage to the pressure chamber and to recover the liquid in the pressure chamber from the collection flow passage, and comprising a first bubble reservoir portion connecting the supply flow passage to the liquid feeding mechanism and a second bubble reservoir portion connecting the collection flow passage to the liquid feeding mechanism;

wherein a volume of the first bubble reservoir portion is larger than a volume of the second bubble reservoir portion, wherein the first bubble reservoir portion includes a first pressure adjustment chamber capable of adjusting a pressure between the supply flow passage and the liquid feeding mechanism, and wherein the second bubble reservoir portion includes a second pressure adjustment chamber capable of adjusting a pressure between the collection flow passage and the liquid feeding mechanism.

14. The liquid ejection apparatus according to claim 13, wherein the printing element board, the supply flow passage, the collection flow passage, and the liquid feeding mechanism are provided to a liquid ejection head which is mounted on a carriage and is movable.

15. The liquid ejection apparatus according to claim 13, wherein the first bubble reservoir unit includes a supply connection flow passage formed in a flow passage member to be stacked on the printing element board, and wherein the second bubble reservoir unit includes a collection connection flow passage formed in the flow passage member.

16. The liquid ejection apparatus according to claim 13, wherein the first pressure adjustment chamber and the second pressure adjustment chamber are provided to a circulation unit connected to a flow passage member stacked on the printing element board.

17. The liquid ejection apparatus according to claim 13, wherein a volume of the first pressure adjustment chamber is larger than a volume of the second pressure adjustment chamber.

18. The liquid ejection apparatus according to claim 13, wherein the first pressure adjustment chamber is connected to the second pressure adjustment chamber through the liquid feeding mechanism, and wherein a bypass flow passage configured to connect the first pressure adjustment chamber to the second pressure adjustment chamber without interposing the liquid feeding mechanism is provided between the first pressure adjustment chamber and the second pressure adjustment chamber.

19. The liquid ejection apparatus according to claim 13, wherein the first pressure adjustment chamber is connected to a liquid tank through a filter.

20. The liquid ejection apparatus according to claim 13, wherein the first bubble reservoir unit and the second bubble reservoir unit are each provided with a slit having a shape of a groove along a flow of the liquid flowing in the first bubble reservoir unit and the second bubble reservoir unit.

* * * * *